US012008855B2

(12) United States Patent
Tansey, Jr. et al.

(10) Patent No.: US 12,008,855 B2
(45) Date of Patent: Jun. 11, 2024

(54) FLUID FILLING STATION

(71) Applicant: Fountain Master, LLC, Middletown, NJ (US)

(72) Inventors: Francis X. Tansey, Jr., Middletown, NJ (US); Gwenivere R. Tansey, Middletown, NJ (US); Joseph F. Tansey, Manalapan, NJ (US)

(73) Assignee: Fountain Master, LLC, Middletown, NJ (US)

( * ) Notice: Subject to any disclaimer, the term of this patent is extended or adjusted under 35 U.S.C. 154(b) by 0 days.

(21) Appl. No.: 17/671,316

(22) Filed: Feb. 14, 2022

(65) Prior Publication Data

US 2022/0415115 A1 Dec. 29, 2022

Related U.S. Application Data

(63) Continuation of application No. 17/077,272, filed on Oct. 22, 2020, now Pat. No. 11,250,659, which is a continuation of application No. 15/078,045, filed on Mar. 23, 2016, now Pat. No. 10,846,975.

(60) Provisional application No. 62/261,616, filed on Dec. 1, 2015, provisional application No. 62/186,686, filed on Jun. 30, 2015, provisional application No. 62/136,933, filed on Mar. 23, 2015.

(51) Int. Cl.

| | |
|---|---|
| ***G07F 13/10*** | (2006.01) |
| ***B65B 3/04*** | (2006.01) |
| ***G07F 13/04*** | (2006.01) |

(52) U.S. Cl.
CPC ................ *G07F 13/10* (2013.01); *B65B 3/04* (2013.01); *G07F 13/04* (2013.01)

(58) Field of Classification Search
CPC . B65B 43/59; B65B 3/04; G07F 13/10; G07F 13/04
See application file for complete search history.

(56) References Cited

U.S. PATENT DOCUMENTS

| | | | | |
|---|---|---|---|---|
| 1,151,185 A | 8/1915 | Jamieson | | |
| 1,524,042 A | 1/1925 | Louis | | |
| 1,644,338 A * | 10/1927 | Jones | A62C 99/0027 | 222/394 |

(Continued)

FOREIGN PATENT DOCUMENTS

| | | |
|---|---|---|
| CN | 101988622 A | 3/2011 |
| EP | 0535478 A1 | 4/1993 |

(Continued)

OTHER PUBLICATIONS

International Search Report and Written Opinion for PCT Application No. PCT/US2016/023713 dated Aug. 11, 2016, 9 pages.

(Continued)

*Primary Examiner* — Timothy P. Kelly
(74) *Attorney, Agent, or Firm* — HALEY GUILIANO LLP

(57) ABSTRACT

A fluid filling station which has a supply tank, filter, transfer pump, a high pressure valve, an optional flow meter, a pressure relief valve, at least one muffler, a filling head, a control module, a purge head, cylinder dispensing mechanism, and its method of use are provided for. This fluid filling station is capable of refilling many types of fluids, but is preferably for the use with carbon dioxide. Additionally, this station is capable of housing and dispensing prefilled refillable fluid containers.

14 Claims, 31 Drawing Sheets

Fill Position

(56) References Cited

U.S. PATENT DOCUMENTS

| | | | | |
|---|---|---|---|---|
| 2,112,519 | A | 3/1938 | Harry | |
| 2,661,885 | A * | 12/1953 | McBean | B65B 31/003 141/105 |
| 2,792,920 | A * | 5/1957 | Sutphen | G07F 13/00 222/25 |
| 2,989,092 | A | 6/1961 | Whitecar | |
| 3,195,585 | A | 7/1965 | Fechheimer | |
| 3,438,790 | A | 4/1969 | Barnby | |
| 3,654,743 | A * | 4/1972 | McGeary | B65B 31/003 141/147 |
| 3,680,659 | A * | 8/1972 | Kasten | F04B 39/0083 55/486 |
| 3,875,980 | A | 4/1975 | Getz | |
| 3,964,515 | A * | 6/1976 | May | F01N 3/22 251/85 |
| 4,146,065 | A | 3/1979 | Borstelmann | |
| 4,305,437 | A * | 12/1981 | Greene | B65B 3/32 141/237 |
| 4,573,505 | A | 3/1986 | Lee et al. | |
| 4,582,100 | A | 4/1986 | Poulsen | |
| 4,637,439 | A * | 1/1987 | Jeans | F16L 29/02 251/339 |
| 4,667,708 | A | 5/1987 | Jernberg | |
| 4,705,082 | A * | 11/1987 | Fanshawe | F17C 5/00 141/82 |
| 4,903,741 | A * | 2/1990 | Ibanez | B67C 3/065 141/46 |
| 4,911,212 | A | 3/1990 | Burton | |
| 4,945,955 | A | 8/1990 | Murphy | |
| 5,163,487 | A * | 11/1992 | Clusserath | B67C 3/10 141/39 |
| 5,320,144 | A * | 6/1994 | Ahlers | B67C 7/00 141/69 |
| 5,587,089 | A | 12/1996 | Vogel et al. | |
| 5,651,477 | A | 7/1997 | Takahashi et al. | |
| 5,797,436 | A | 8/1998 | Phallen et al. | |
| 5,827,050 | A * | 10/1998 | Price | H05B 3/58 62/149 |
| 5,913,344 | A * | 6/1999 | Wronski | F17C 5/005 141/94 |
| 5,916,246 | A | 6/1999 | Viegas et al. | |
| 5,934,081 | A | 8/1999 | Notaro et al. | |
| 6,044,647 | A | 4/2000 | Drube et al. | |
| 6,053,219 | A * | 4/2000 | Seiver | G01G 17/06 141/83 |
| 6,060,691 | A | 5/2000 | Minami et al. | |
| 6,158,482 | A * | 12/2000 | Rubin | F17C 5/02 141/289 |
| 6,197,189 | B1 | 3/2001 | Schwartz et al. | |
| 6,209,590 | B1 * | 4/2001 | Mandsberg | B65B 43/59 141/82 |
| 6,354,088 | B1 | 3/2002 | Emmer et al. | |
| 6,510,874 | B2 * | 1/2003 | Hasenkopf | G07F 7/0609 141/2 |
| 6,609,381 | B1 * | 8/2003 | Morgan | F17C 7/02 141/83 |
| 6,612,346 | B1 * | 9/2003 | Allen | B60S 5/04 141/38 |
| 6,655,422 | B2 | 12/2003 | Shock | |
| 6,695,017 | B1 | 2/2004 | Liedtke | |
| 6,761,194 | B1 * | 7/2004 | Blong | F17C 13/084 221/312 R |
| 6,923,007 | B1 | 8/2005 | Markham et al. | |
| 7,456,374 | B2 * | 11/2008 | Gerver | F17C 13/04 219/544 |
| 7,571,586 | B1 * | 8/2009 | Morales | B08B 9/28 53/167 |
| 8,967,208 | B2 * | 3/2015 | Bridges | A62C 35/15 141/3 |
| 8,985,395 | B2 | 3/2015 | Tansey | |
| 9,637,258 | B1 * | 5/2017 | Haley | B65B 3/26 |
| 9,809,437 | B2 | 11/2017 | Tansey | |
| 10,846,975 | B2 * | 11/2020 | Tansey, Jr. | B65B 3/04 |
| 11,250,659 | B2 * | 2/2022 | Tansey, Jr. | G07F 13/10 |
| 2003/0051767 | A1 * | 3/2003 | Coccaro | B67D 7/346 141/351 |
| 2003/0167203 | A1 * | 9/2003 | Thorne | G06Q 30/02 705/14.26 |
| 2004/0023087 | A1 * | 2/2004 | Redmond | B82Y 30/00 222/3 |
| 2005/0023075 | A1 | 2/2005 | Schmaeman | |
| 2005/0034777 | A1 * | 2/2005 | Nicodem | B41J 2/17506 141/2 |
| 2008/0249838 | A1 * | 10/2008 | Angell | G06Q 30/02 705/7.29 |
| 2009/0277531 | A1 * | 11/2009 | Pongraz | F17C 5/06 251/366 |
| 2009/0283175 | A1 * | 11/2009 | Husard | B65B 39/12 141/1 |
| 2010/0071802 | A1 | 3/2010 | Clusserath et al. | |
| 2011/0147194 | A1 | 6/2011 | Kamen et al. | |
| 2011/0225106 | A1 | 9/2011 | Levenstein et al. | |
| 2012/0156337 | A1 | 6/2012 | Studor et al. | |
| 2012/0199571 | A1 | 8/2012 | Brown | |
| 2013/0240079 | A1 | 9/2013 | Petrini | |
| 2014/0090745 | A1 * | 4/2014 | Plummer | F17C 13/003 141/4 |
| 2014/0210203 | A1 | 7/2014 | Lorkowsi | |
| 2014/0216603 | A1 * | 8/2014 | Brown | G07F 13/025 141/94 |
| 2014/0251459 | A1 | 9/2014 | MacNeal et al. | |
| 2015/0053091 | A1 * | 2/2015 | Wilder | B67D 7/348 235/492 |
| 2016/0272346 | A1 * | 9/2016 | Hauke | B65B 39/12 |
| 2016/0284153 | A1 * | 9/2016 | Tansey, Jr. | B65B 3/10 |
| 2017/0224140 | A1 * | 8/2017 | Vertegaal | G06F 3/04883 |
| 2017/0314733 | A1 * | 11/2017 | Tilhof | F17C 13/02 |
| 2021/0217266 | A1 | 7/2021 | Tansey et al. | |

FOREIGN PATENT DOCUMENTS

| | | | |
|---|---|---|---|
| EP | 0660026 | A1 | 6/1995 |
| EP | 1139307 | A2 | 10/2001 |
| EP | 1371895 | A2 | 12/2003 |
| GB | 2293764 | A | 4/1996 |
| JP | 63231098 | | 9/1988 |
| RU | 2332612 | C1 | 8/2008 |
| WO | 9209867 | | 6/1992 |
| WO | 9209867 | A1 | 6/1992 |
| WO | 2012071593 | A2 | 5/2012 |
| WO | 20120071593 | | 5/2012 |
| WO | 2015089096 | A1 | 6/2015 |

OTHER PUBLICATIONS

Machine translation of Abstract for CN101988622 corresponding to CN101988622, 2016.

Machine translation of Abstract for JPH02149540 corresponding to JPS63231098, 2016.

Machine translation of Abstract for RU2332612, 2016.

Schuck, Application Serial No. 856,831 filed on Dec. 2, 1977, laid open to public inspection on Nov. 7, 1978 as noted at OG 976,0001.

* cited by examiner

FLUID FILLING STATION

CROSS-REFERENCE TO RELATED APPLICATIONS

This application is a continuation of U.S. patent application Ser. No. 17/077,272, filed Oct. 22, 2020, which is a continuation of U.S. patent application Ser. No. 15/078,045, filed Mar. 23, 2016, (now U.S. Pat. No. 10,846,975), which claims priority to U.S. Provisional Patent Application No. 62/136,933, filed on Mar. 23, 2015, U.S. Provisional Patent Application No. 62/186,686, filed on Jun. 30, 2015, and U.S. Provisional Patent Application No. 62/261,616, filed on Dec. 1, 2015. The contents of all of these applications are herein incorporated by reference in their entirety.

FIELD OF THE INVENTION

The invention relates to a filling station for refillable fluid containers. In particular, a self-serve fluid refilling station with cylinder dispenser equipped with a pre-filled refillable fluid container exchange system.

BACKGROUND OF THE INVENTION

The invention relates to a self-serve fluid filling station for portable fluid containers. Fluids serve a number of uses in today's world, in both industrial and residential settings. Be it the liquid nitrogen used in chemical laboratories, the gasoline used to power combustion engines, or the ammonium hydroxide used to treat lean finely textured beef, fluids have wide industrial applicability. Further, fluid's residential uses include propane for grills, oxygen for the infirm, and carbon dioxide for beverage dispensing devices. There exist other applications of fluids far too numerous to list here.

However, despite the variety in each of the uses for these fluids, one thing remains constant; all of these fluids must be stored in some sort of sealed container. While some of these containers have no mandated qualifications, many of these containers store the fluids at high pressures, which provides for a number of challenges. One such challenge is the need to retain the structural integrity of the container. Another challenge is refilling these pressurized containers without contaminating the contents of the container, as well as not damaging the seal of the pressurized container while engaging the refilling mechanism. Another challenge is filling these containers with a specific volume of liquid especially when that liquid is considered a cryogenic fluid such as liquid carbon dioxide. Due to these challenges, there exist few places where someone can refill a fluid container, and certainly no automated self-serve kiosks to do so in. Further, due to the aforementioned challenges, one must have some level of skill to refill the fluid containers that currently exist in the art. Further, due to legal restrictions on shipping and transporting pressurized containers, this problem is further compounded.

Given these problems, refillable pressurized fluid containers are typically limited to industrial use and refillable only at select refilling facilities. Therefore, there is a need in the art for a means for a non-industrial pressurized fluid container refilling machine that is capable of refilling these containers safely, quickly and with convenience to the customer. In particular, there is a need for an automated self-serve kiosk that is capable of safely, quickly, and efficiently refilling these fluid containers, especially if such a kiosk can automate this task. Further, if this kiosk were able to dispense empty and pre-filled cylinders, it would solve many of the aforementioned problems.

SUMMARY OF THE INVENTION

The present invention provides for a fluid filling station, comprising: a supply tank having a dip tube and a valve; a high pressure valve; a flow meter; a pressure relief valve; a first muffler; at least one filling head, wherein said supply tank, said high pressure valve, said flow meter, said pressure relief valve, said first muffler, and said at least one filling head are in fluid communication; a control module; a purge head; a lift and rotation mechanism comprising a refillable fluid container holder, comprising a scale and at least one tank gripper; a display, displaying a user interface; a payment processing module; a telemetry control unit; a power source; an RFID reader; a temperature sensor; a temperature control system; a battery backup, wherein said control module is in electronic communication with said at least one filling head, said purge head, said lift and rotation mechanism, said display, said payment processing module, said telemetry control unit, said power source, said RFID reader, said temperature sensor, said temperature control system, and said battery backup; a second muffler, wherein said second muffler is in fluid communication with said purge head. It should be noted that the phrase "control module" is synonymous with the phrase "CPU."

In a preferred embodiment, this fluid filling station is suitable for use at retail establishments, comprising a supply tank capable of supplying a gas, the supply tank in fluid communication with a filling head; a holder, shaped to receive a refillable fluid container; a lift mechanism capable of bringing said refillable fluid container into fluid communication with the filling head in a manner where the refillable fluid container can receive gas from the supply tank; a power source connected to a memory, a processor, and a radio communications controller disposed on the filling station; a credit card processing module connected to at least one of said memory, said processor, and said radio communications controller; and at least one sensor.

In yet another preferred embodiment, the present invention comprises a method of refilling a refillable fluid container, comprising the steps of: placing, by a user, a refillable fluid container into a fluid refilling station, said fluid refilling station comprising: a supply tank; a high pressure valve; a flow meter; a pressure relief valve; a first muffler; at least one filling head, wherein said supply tank, said high pressure valve, said flow meter, said pressure relief valve, said first muffler, and said at least one filling head are in fluid communication; a control module; a purge head; a lift and rotation mechanism comprising a refillable fluid container holder having a scale and at least one tank gripper; a display, displaying a user interface; a payment processing module; a telemetry control unit; a power source; an RFID reader; a temperature sensor; a temperature control system; a battery backup, wherein said control module is in electronic communication with said at least one filling head, said purge head, said lift and rotation mechanism, said display, said payment processing module, said telemetry control unit, said power source, said RFID reader, said temperature sensor, said temperature control system, and said battery backup; a second muffler, wherein said second muffler is in fluid communication with said purge head; supplying, payment by the user; running a diagnostic evaluation on the refillable fluid container; exchange of data between a filling station, an external server, and said refillable fluid container; securing the refillable fluid container in said holder; engaging, by the refillable fluid container with the purge head; purging, fluid out of said refillable fluid container; disengaging, said refillable fluid container from said purge head; orienting said refillable fluid container to engage the refill head; and refilling, said refillable fluid container. In some embodiments this fluid filling station further comprising a high pressure air compressor while in other embodiment said refillable fluid container is a refillable fire extinguisher. In other embodiments, the fluid is air.

In another embodiment, the present invention contemplates a fluid filling station, comprising: a supply tank; a filter; a transfer pump; a high pressure valve; a flow meter; a pressure relief valve; a first muffler; at least one filling head, wherein said supply tank, said filter, said transfer pump, said high pressure valve, said flow meter, said pressure relief valve, said first muffler, and said at least one filling head are in fluid communication; a control module; a purge head; a lift and rotation mechanism comprising a refillable fluid container holder having a scale and at least one tank gripper; a display, displaying a user interface; a payment processing module; a telemetry control unit; a power source; an RFID reader; a temperature sensor; a pressure sensor; a temperature control system; a battery backup, wherein said control module is in electronic communication with said at least one filling head, said purge head, said lift and rotation mechanism, said display, said payment processing module, said telemetry control unit, said power source, said RFID reader, said temperature sensor, said temperature control system, and said battery backup; a second muffler, wherein said second muffler is in fluid communication with said purge head. Preferably, said high pressure valve and/or said pressure relief valves are solenoids, said temperature control system comprising a thermostatic-controlled cylinder electric heater jacket, heating and cooling system comprising a compressor based refrigerated cooling unit and heating coil, and wherein said pressure sensor is selected from the group consisting essentially of: pressure sensors, pressure transducers, vacuum transmitters, vacuum transducers, low pressure transducers, electronic pressure sensors, and electronic pressure transducers. In alternative embodiments, this flow meter is selected from the group consisting essentially of: Coriolis Mass meters, vane/piston meters, float-style meters, positive displacement meters, thermal meters, laminar flow elements, paddle wheel meters, magnetic meters, ultrasonic meters, turbine meters, differential pressure meters, and vortex shredding meters. Further, the present invention may be equipped with a valve heater disposed on said supply tank. Alternatively, at least one filling head is comprised of a plunger, a plunger lift mechanism, a fluid inlet, a fluid outlet, and a gasket, wherein said plunger lift mechanism is capable of moving said plunger such that said plunger depresses a pin valve proximate to said plunger, wherein said supply tank is a bulk storage tank, and further comprises a fill port, and wherein said supply tank is in fluid communication with said high pressure valve via a tank connector. In other embodiments the supply tank of the present invention has a dip tube and a valve.

Preferably, the present invention further comprises a housing having a front face, a left face, a right face, a back face, and a top face, wherein said left face or said right face comprises an access panel. In alternative embodiments, said front face further comprises a credit card swipe mechanism; a display showing a user interface; at least one video camera; at least one speaker; at least one microphone; an external bar code scanner; and a cylinder filling area and said top face further comprises an antenna; and an electronic advertising medium.

In another embodiment the invention relates to a fluid filling station, comprising: a supply tank, equipped with a dip tube and a CGA-320 valve; a filling head; at least one tube connected to said supply tank and said filling head, wherein said at least one tube is equipped with a regulator, a solenoid valve, and a pressure relief valve; a connector affixed to said filling head; a holder, shaped to receive a refillable pressurized fluid container; a scale; and a lift mechanism capable of moving said filling head and said connector, or capable of moving said holder, wherein said lift mechanism is equipped with a piston lift; a power source connected to a memory, a processor, and a radio communications controller; a credit card processing module connected to said memory, said processor, and said radio communications controller; at least one sensor.

In a preferred embodiment, the present invention comprises a self-serve $CO_2$ filling station that provides a means for users to fill and re-fill small $CO_2$ refillable cylinders of various sizes. These refillable cylinders may be, for example, a 1 lb (16 oz) or 1.5 lb (24 oz) cylinder. These $CO_2$ cylinders are commonly used for at home beverage carbonation machines but can also be used for other purposes. Preferably, the $CO_2$ cylinders intended to be used with the present invention are made primarily from aluminum. However, it should be contemplated that these cylinders can be made of other materials such as steel, fiberglass, plastic or a combination of said materials. This device can also be adapted to fill other gases including but not limited to argon, nitrogen, propane, oxygen, etc.

In another preferred embodiment, each refillable fluid container will be equipped with a unique identifier printed and/or embedded on it. This unique identifier can be in the form of optical identifiers and electronic identifies, such as, for example, a QR Code, Bar code, Binary Code, or RFID Tag, which will contain information about the cylinder upon which it is attached. Such information may be included, but should not be limited to, the most recent hydrostatic testing date, the cylinder's type, the cylinder's size, as well as the cylinder's maximum and recommended fill pressure and volume. This unique identifier provides a means to track cylinder and user data. For example, by tracking the cylinder with a unique identifier a manufacturer or distributor of these refillable cylinders can tell how many times the cylinder was filled and in what time period, the health of the cylinder, track user consumption habits, and for safety purposes determine if the cylinder is past its hydrostatic testing date, disabling the filling of the cylinder until it is hydrostatically tested. Alternatively, this unique identifier could be used to screen refillable fluid containers that are not proprietary to the present invention.

For example, the present invention is suitable to fill the refillable $CO_2$ containers disclosed in U.S. Pat. No. 8,985,395, the contents of which are hereby incorporated by reference.

In yet another preferred embodiment, the present invention is comprised of an automated self-serve $CO_2$ filling station, which is capable of operating similarly to a standard vending machine or kiosk. There, a user places their $CO_2$ cylinder into the present invention's tank safety holder. Then the present invention reads an identifier, such as a QR Code or RFID tag, on the cylinder and validates the cylinder is able to be refilled. The user interface (preferably displayed on an equipped LCD Touch Screen) on the present invention is capable of indicating to a user that the cylinder is optimized for the present invention and is capable of being refilled by the present invention. The user may then swipe their credit card through the credit card authorization slide/slot which connects through the machine's radio communications controller of the present invention to a secure credit card processing facility, and once approved the present invention begins refilling the fluid container (cylinder), or performing some other desired functionality. In a preferred embodiment, the present invention is equipped with a safety door. This door will block access to the cylinder to prevent a user from touching or moving the cylinder during filling.

In a preferred embodiment, once the safety door is closed the holder raises the cylinder upward until the top of the cylinder engages into the filling head. In a preferred embodiment, this is achieved by a lifting mechanism. This lifting mechanism can be configured to provide for a top lower or a bottom lift. When the lifting mechanism is configured to provide for a top lower, the lifting mechanism will lower and raise a filling head with a sleeve actuated connector assembly. When the lifting mechanism is configured to provide for a bottom lift, the lifting mechanism is capable of raising the safety holder such that the refillable cylinder will engage with a sleeve actuated connector to create fluid communication between the filling head and refillable fluid container. The lifting mechanism may employ, for example, hydraulic pistons, scissor lifts, and/or a series of gears and pulleys. The filling head contains a sleeve-actuated connector, or similar type quick connector that engages with the refillable cylinder's pin valve assembly, locking the two objects together. Once engaged, these two pieces become fluidly connected and the machine can start refilling. The CPU of the present invention will then run a diagnostic on the cylinder to obtain data needed for refilling. Once complete the CPU opens the solenoid valve, preferably a high-pressure solenoid valve, allowing liquid fluid to flow from the supply tank (donor tank) into the refill tank (refillable cylinder). The flow of liquid fluid can be measured by weight in the refill tank using a scale, by volumetric displacement, by special flow meter, or by other standard measuring methods.

Once the specified pressure/weight/quantity has been reached, the CPU closes the solenoid valve stopping the flow of liquid fluid from the supply tank into the fluid refill tank. The CPU communicates with the pressure relief valve opening it to relieve the excess pressure in the line. The sleeve-actuated connector disengages from the cylinder pin valve assembly releasing it, allowing the cylinder to disengage from the filling head. Once this is complete the tank safety holder lowers the cylinder downward until the cylinder is back to its original positon. At this point the safety door opens allowing access to the cylinder. The process is complete and the user takes their cylinder. It should be considered that the present invention will be able to alert a company, for example, when the supply tank is empty, is getting low, or needs to be changed or serviced. Preferably, this fluid is $CO_2$.

The present invention also contemplates a method of refilling a refillable fluid container, comprising the steps of placing, by a user, a refillable fluid container into a holder; supplying, payment by the user; securing the refillable fluid container in said holder; engaging, by the refillable fluid container with the purge head; purging, gas out of said refillable fluid container; disengaging, said refillable fluid container from said purge head; orienting said refillable fluid container to engage the refill head; weighing and zeroing out the container; refilling, said refillable fluid container.

In a preferred embodiment, while the present invention is filling a refillable fluid container, the CPU of the present invention will collect a user's data from the current filling session. This data is then transferred via Wi-Fi, or a similar radio communications protocol, across the internet to the company's backend database servers into the user's account. This account may serve as a sharing portal for all user data. This information may be shared with a wide variety of internet-enabled electronic devices as well as various software applications.

Preferably, the $CO_2$ supply tank will be a siphon type $CO_2$ tank. However, any type of $CO_2$ holding tank or $CO_2$ generating system capable of supplying liquid $CO_2$ through the tank valve will be suitable for use with the present invention. This provides the benefit that liquid $CO_2$ may be dispensed as opposed to solely gaseous $CO_2$. Preferably, this tank valve will be a CGA-320 valve. In a preferred embodiment, this liquid $CO_2$ is needed to fill/re-fill the small $CO_2$ refillable cylinder. It should be considered that throughout the application the terms cylinder and tank may be used interchangeably as in $CO_2$ cylinder or $CO_2$ tank.

It should also be considered that in the various embodiments of the present invention the connection method between the filling head and the $CO_2$ refill tank can be performed, for example, by a sleeve-actuated connecter, screw connection, pressure clamping mechanism, quick lock snap connection or similar found in the compressed gas industry. It should also be noted that this $CO_2$ refill tank valve connection can have male or female threads, no treads, or some type of proprietary connection means.

In another preferred embodiment, the present invention will be equipped with a container that a user will be allowed to deposit damaged cylinders into. In yet another preferred embodiment, the present invention is capable of exchanging, housing, selling, and dispensing new cylinders to a user. These cylinders may be pre-filled, may be filled by the machine, or may be distributed without being filled.

In one embodiment, the present invention will be equipped with a mechanism that allows the present invention to hydrostatically test the cylinder to be refilled. This mechanism will allow the cylinder to be pressurized at, for example, 166.66%, 143%, or 150% of the recommended fill pressure while assessing the existence of any leaks.

It should be noted that the present invention may be enclosed in a housing. In one embodiment, this housing is primarily cosmetic and therefore may be shaped in a way that is pleasing to a user. Further, in an alternative embodiment, this housing may have a lip, a small ledge, or a table at the front or side of the housing.

The present invention may be interfaced via a software application. Preferably, this software application will be optimized to run on a smartphone, tablet, or other internet-enabled electronic device. The telemetry control module in the filling station may broadcast signals at frequencies associated with, for example, Wi-Fi or 4G. Further, the telemetry control module transmits and receives user specific data, a data exchange, to a company's backend servers via the users account. This data is captured through the filling stations various sensors including but not limited to its QR Code/Bar Code/RFID reader, camera, microphone, and used to build a usage profile for every customer. This data is used to benefit the customer as well as a given company to make the user's experience simple, as well as track the user's statistics. The operation and transmittal of data between the filling station and the company's backend servers can use, for example MDB protocol and a DEX accountability system which can be assumed to be protected under secure Wi-Fi standards, firewalls and standard internet security procedures that would already be in place. This data will also be optionally encrypted with a standard or proprietary hashing algorithm.

For example, some of a user's data that may be collected will include, but not be limited to, a user's name, address, phone, email, password, frequency of usage, special coupons, reminders emails, demographic identifiers and $CO_2$ usage.

The software application will communicate with the company's servers via internet connectivity to provide inventory updates and sync details between the filling station and users' online account. For example when a user purchases a new refillable fluid cylinder, that user may simply use their internet-enabled electronic device to scan the QR Code/Bar Code on the cylinder and add that item to their online user account for tracking.

In addition, the software application preferably provides a dashboard to a user to view their filling statistics. This can include, for example, $CO_2$ consumption as it relates to the number and type of drinks consumed per day/week/month. This information may in turn be integrated into the user's diet program or other various popular other software application such as My Fitness PAL and iFit®. This will allow the present invention to be a component of a total dietary health program.

Therefore, the present invention succeeds in conferring the following, and others not mentioned, desirable and useful benefits and objectives.

DETAILED DESCRIPTION OF THE PREFERRED EMBODIMENTS

Figure 1:
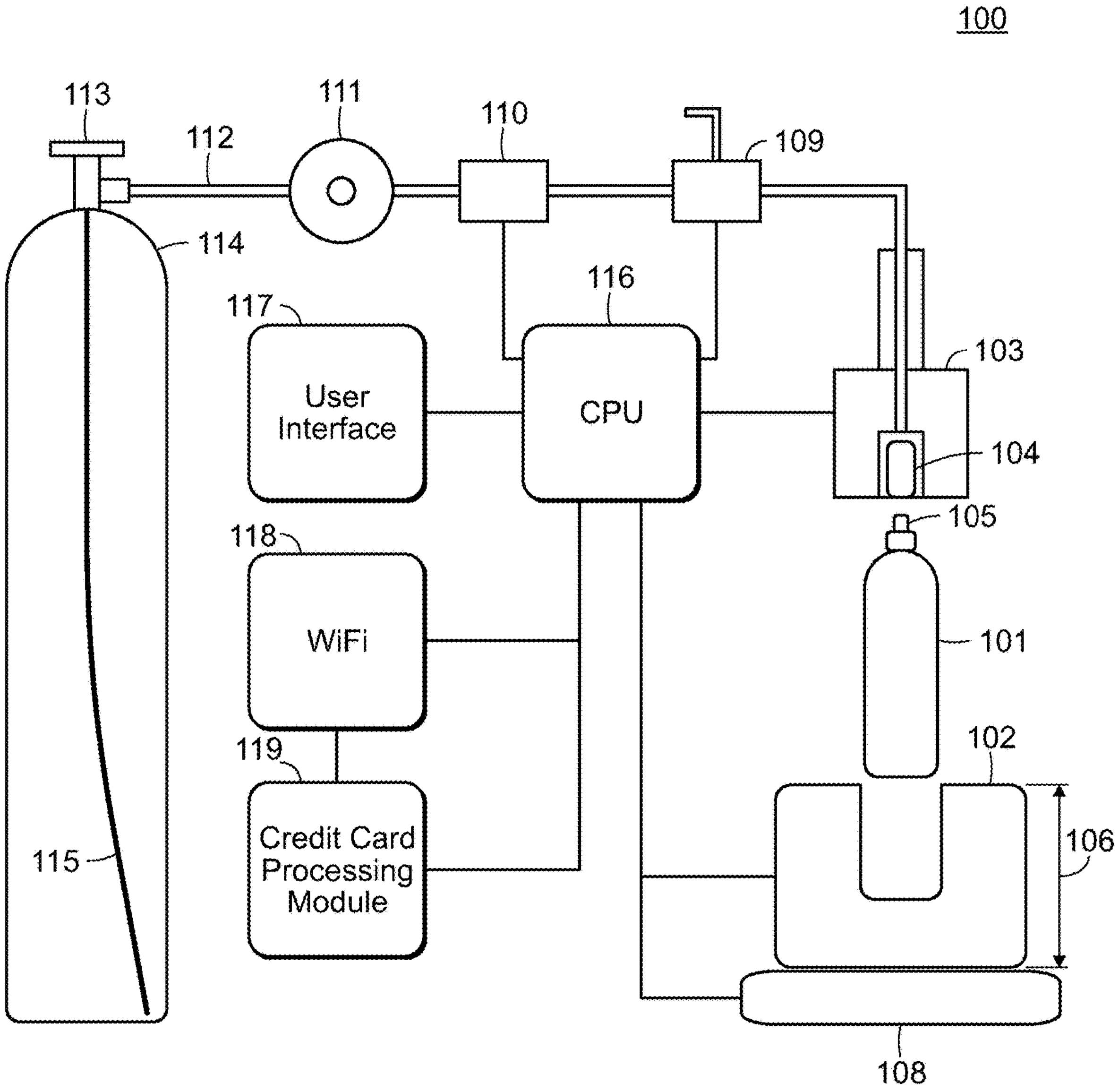
FIG. 1 shows a schematic of an embodiment of the present invention equipped with a bottom lift mechanism, shown in the open position.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring to FIG. 1 shows a schematic of an embodiment of the present invention equipped with a bottom lift mechanism, shown in the open position. Here fluid filling station 100 is comprised of holder 102, filling head 103 (which may include a one-way check valve), sleeve actuated connector 104, pressure relief valve 109, high pressure solenoid valve 110, regulator 111, high pressure flexible tubing 112, tank valve 113, supply tank 114 equipped with dip (siphon) tube 115, radio communications controller 118, user interface 117 and payment processing module 119. Fluid filling station 100 is capable of filling and refilling refillable fluid container 101. In an alternative embodiment, refillable fluid container 101 is equipped with pin valve 105. Preferably, pin valve 105 is proprietary in its design.

Supply tank 114 is preferably equipped with dip (siphon) tube 115 as the invention operates best when supply tank 114 is filled with the liquid phase of a fluid. This is preferable because a larger volume of fluid may be dispensed to a user if dispensed in the liquid phase. In this particular embodiment lift mechanism 106 is in the form of a bottom-mounted lift with scale 108 located below lifting mechanism 106. CPU 116 opens high pressure solenoid valve 110 allowing the liquid phase of the fluid in supply tank 114 to flow from supply/donor tank 114 into refillable fluid container 101. The flow of this fluid can be measured by weight in the refill tank using scale 108, by special flow meter (See FIG. 10A), or by other, not explicitly disclosed methods. Once the specified pressure/weight/quantity has been reached, CPU 116 closes the high pressure solenoid valve 110, stopping the flow of the fluid from the donor tank 114 into refillable fluid container 101.

In a preferred embodiment, CPU 116 communicates with pressure relief valve 109, opening it to relieve the excess pressure in tubing 112. Preferably, tubing 112 is high pressure flexible tubing commonly used in the beverage industry. Here sleeve actuated connector 104 disengages from pin valve assembly 105, releasing it, allowing refillable fluid container 101 to disengage from at least one filling head 103. The terms "cylinder," "tank," and "container" can be used interchangeably as in refillable fluid or refillable fluid tank.

It is important to note that in many preferred embodiments, refillable fluid container 101 requires that the container be cold in order to fill it to its full capacity. This is especially true when carbon dioxide is the fluid being filled by the instant invention. This is because if refillable fluid container 101 is filled at room temperature, it will only fill to roughly 50% capacity because, while in refillable fluid container 101, during the process of being filled, the liquid phase of the fluid is going to evaporate into its gaseous phase, preventing refillable fluid container 101 from being filled to its designated fill capacity. In yet another preferred embodiment, filling refillable fluid container 101 to capacity involves filing refillable fluid container 101 to half capacity. Upon reaching half capacity, pressure relief valve 109 will be engaged to reduce some of the pressure inside refillable fluid container 101, forcing it to reduce its internal temperature via a thermogenic evaporative reaction. This reduction in temperature provide the necessary temperature to allow fluid filling station 100 to fill refillable fluid container 101 to its designated maximum capacity. This effect can also be achieved by filling refillable fluid container 101 for a predetermined time interval before reducing pressure to create a chilling thermogenic reaction.

Figure 2:
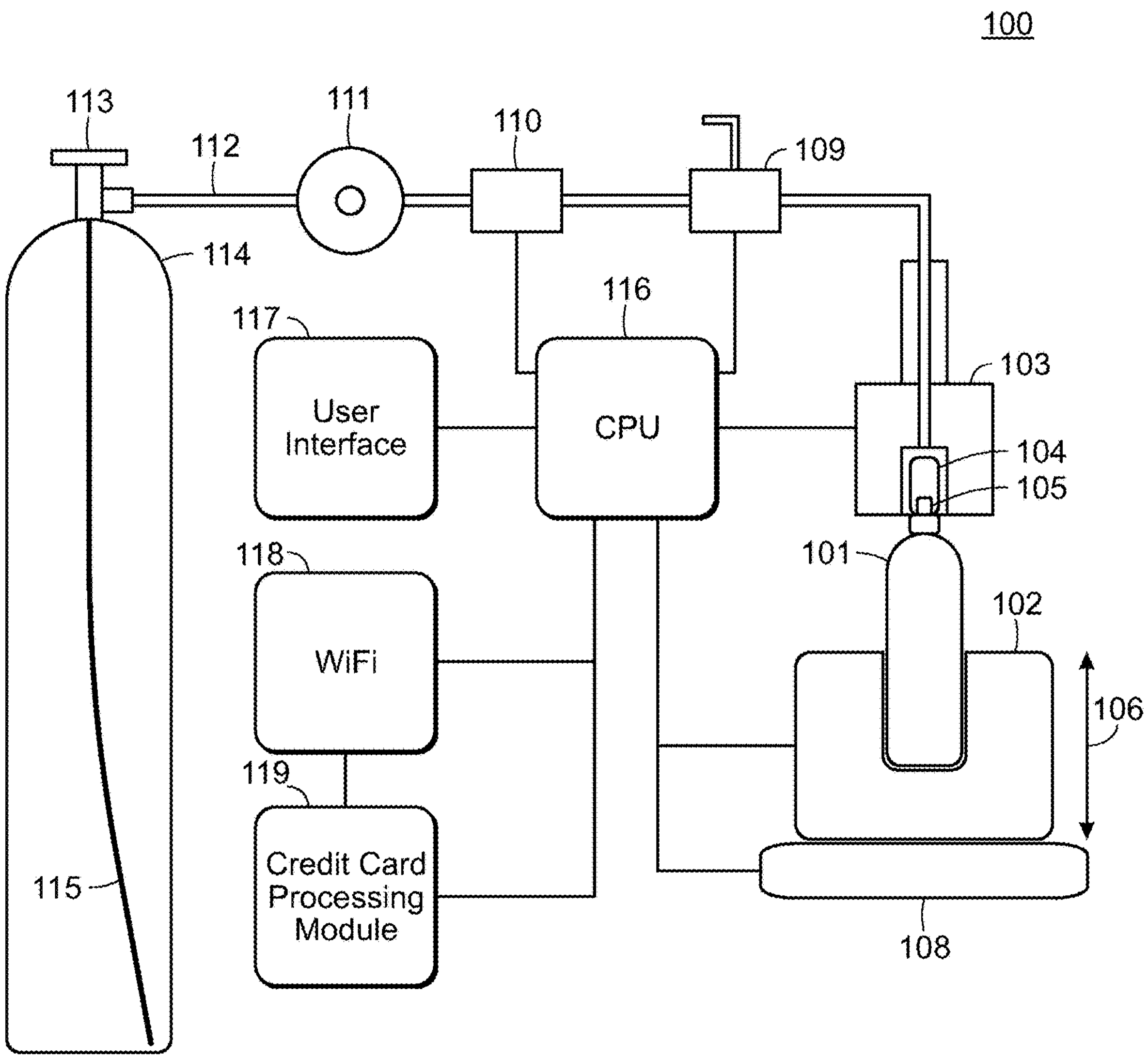
FIG. 2 shows a schematic of an embodiment of the present invention equipped with a bottom lift mechanism, shown in the closed position.

FIG. 2 shows a schematic of an embodiment of the present invention equipped with a bottom lift mechanism, shown in the closed position. Like FIG. 1, fluid filling station 100 is comprised of holder 102, filling head 103, sleeve actuated connector 105, pressure relief valve 109, high pressure solenoid valve 110, regulator 111, high pressure flexible tubing 112, tank valve 113, supply tank 114 equipped with dip (siphon) tube 115, radio communications controller 118, user interface 117 and payment processing module 119. Further, fluid filling station 100 remains capable of filling and refilling refillable fluid container 101.

Of note here is the insertion of refillable fluid container 101 into holder 102. Also of note is the construction of the interface of at least one filling head 103 and refillable fluid container 101. Pin valve 105 is connected to at least one filling head 103 via sleeve actuated connector 104. It should be noted that similar quick-connectors may be substituted in lieu of sleeve actuated connector 104. Fluid filling station 100 retains this position until refillable fluid container 101 is filled to a predetermined level, volume, and/or weight.

Figure 3:
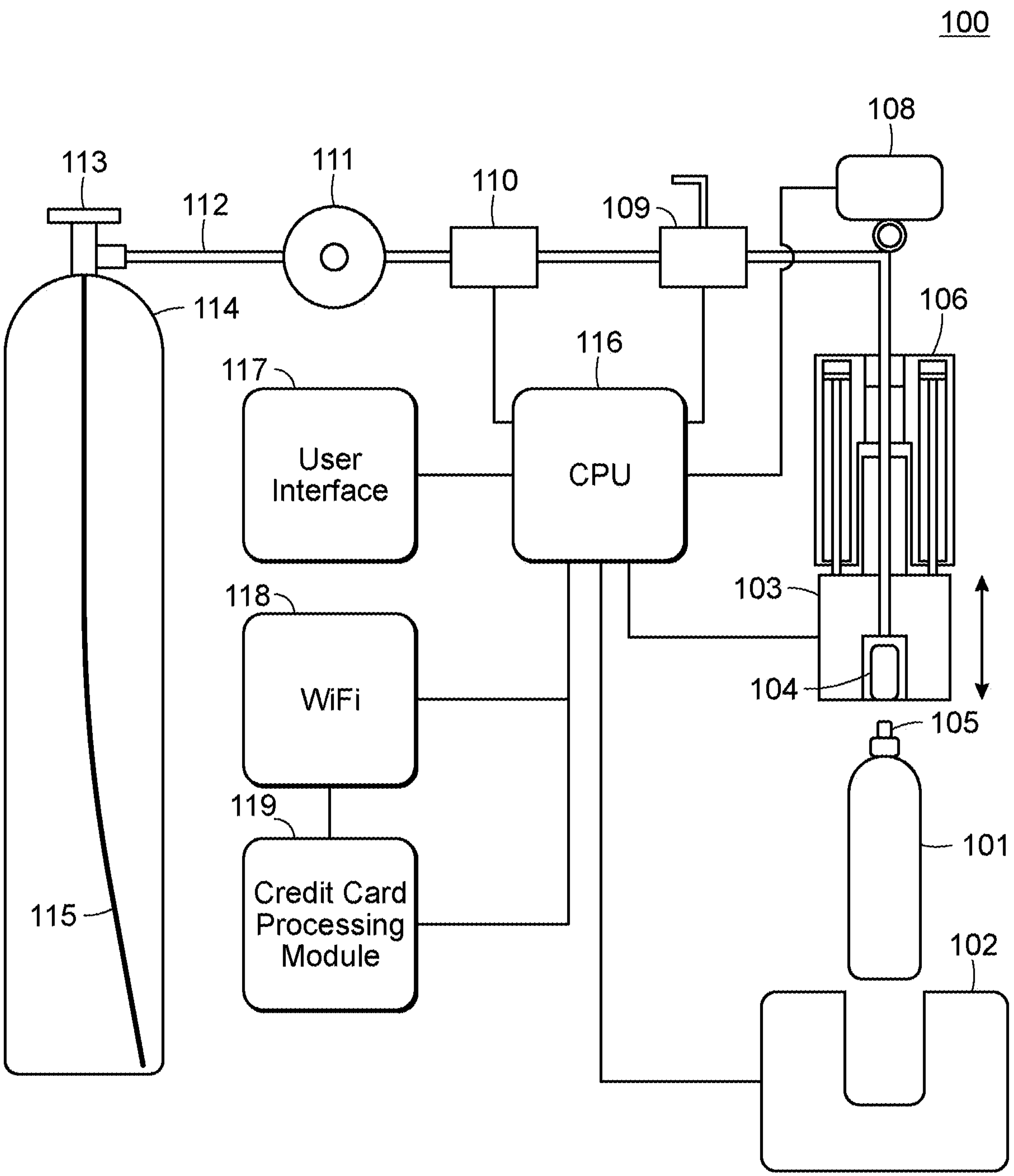
FIG. 3 shows a schematic of an alternative embodiment of the present invention equipped with a top lowering mechanism, shown in the open position.

Referring to FIG. 3, a schematic of an alternative embodiment of the present invention equipped with a top lowering mechanism, shown in the open position. Like the previous two figures, this embodiment of fluid filling station 100 is comprised of holder 102, filling head 103, sleeve actuated connector 104, pressure relief valve 109, high pressure solenoid valve 110, regulator 111, high pressure flexible tubing 112, tank valve 113, supply tank 114 equipped with dip (siphon) tube 115, radio communications controller 118, user interface 117 and payment processing module 119. However, here lift mechanism 106 is in the form of a top-mounted piston lowering lift. Note how in this embodiment, scale 108 is located above lifting mechanism 106. It should also be noted that in many embodiments, fluid filling station 100 is equipped with a variety of sensors to provide feedback to CPU 116 to monitor various criteria.

Figure 4:
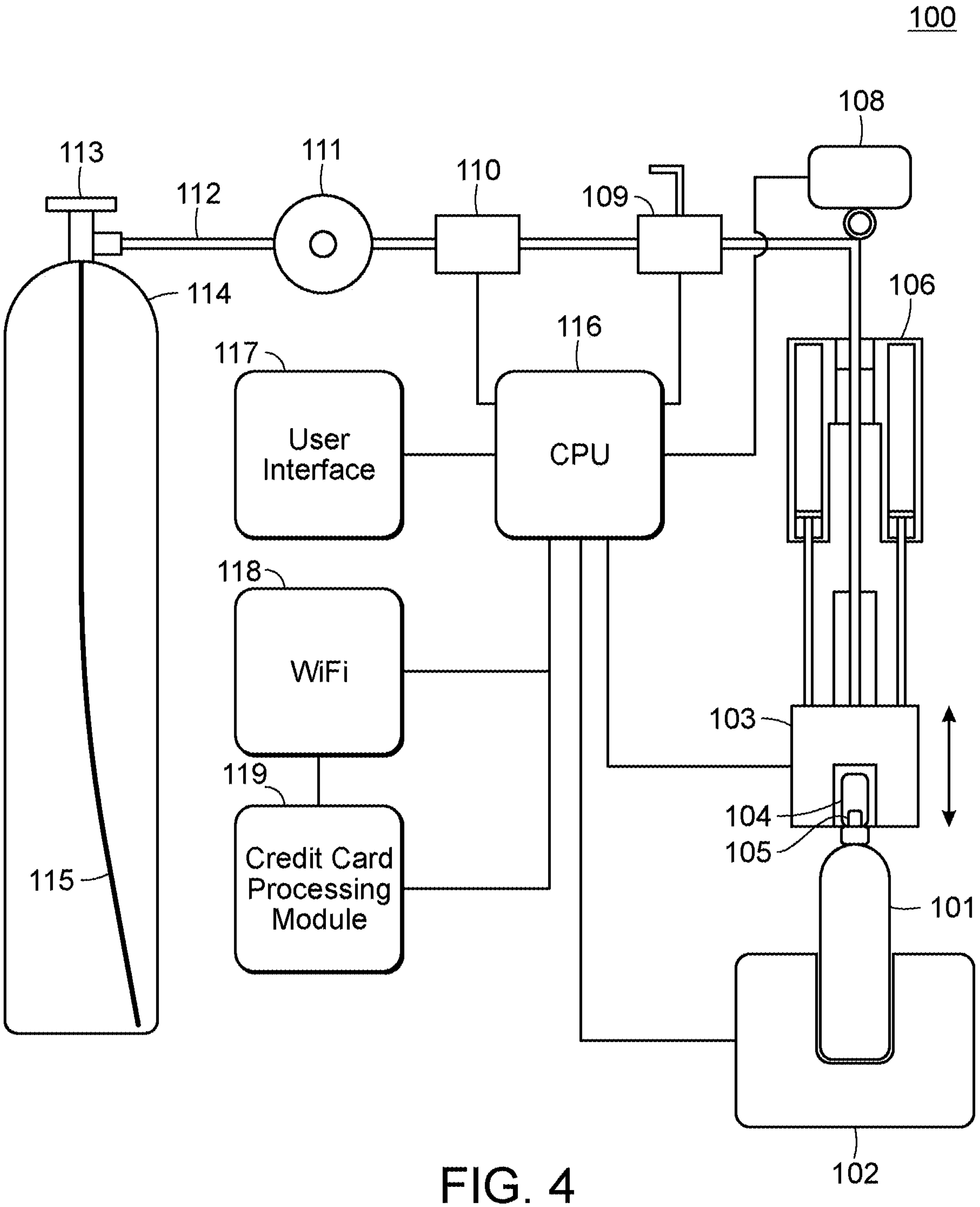
FIG. 4 shows a schematic of an alternative embodiment of the present invention equipped with a top lowering mechanism, shown in the closed position.

FIG. 4 shows a schematic of an alternative embodiment of the present invention equipped with a top lowering mechanism, shown in the closed position. This is the same embodiment as shown in FIG. 3, with the exception that lift mechanism 106 is extended such that filling head 103 is attached to refillable fluid container 101 via sleeve actuated connector 104.

Figure 5:
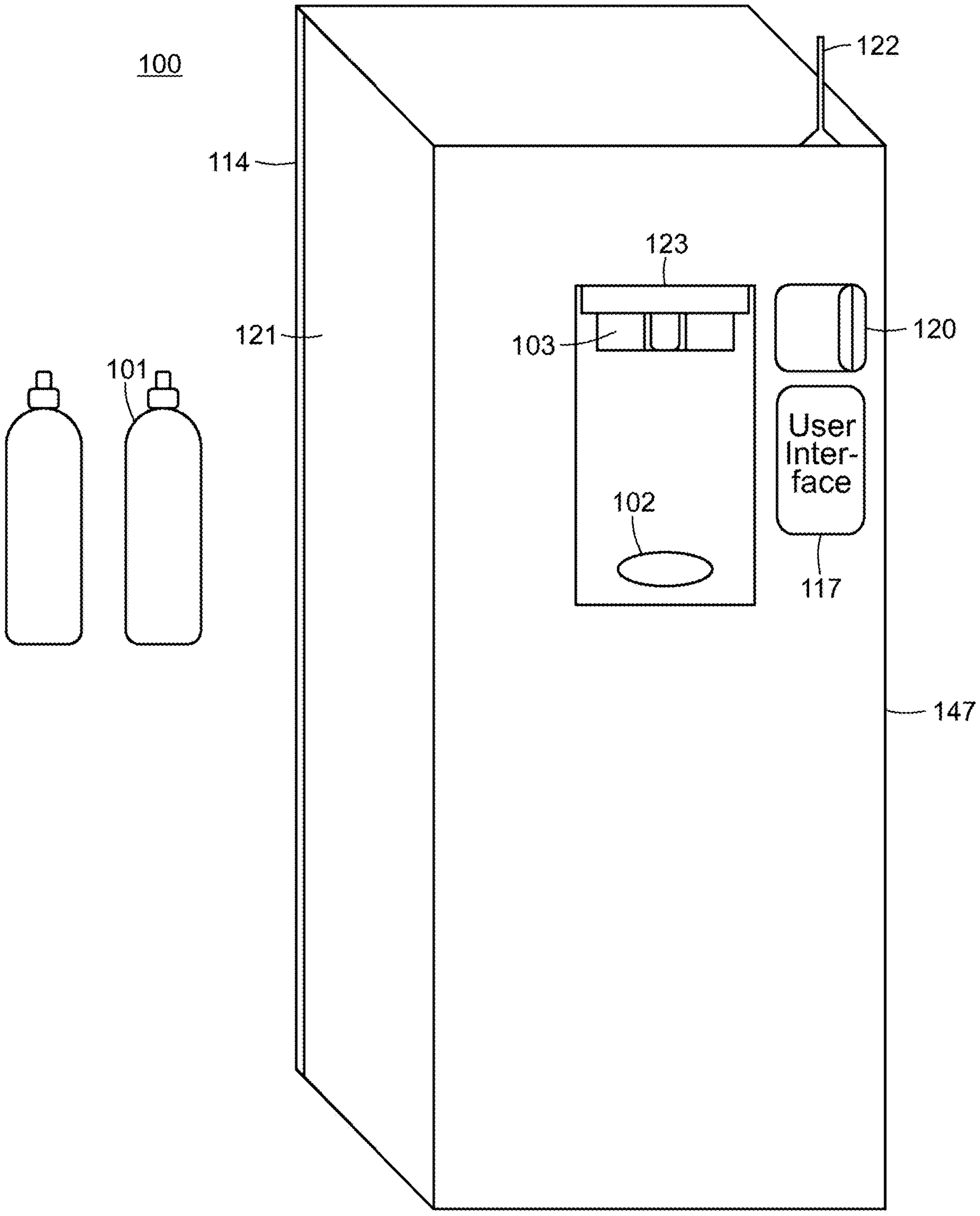
FIG. 5 shows an illustration of an embodiment of the present invention ready to be used.
Figure 6:
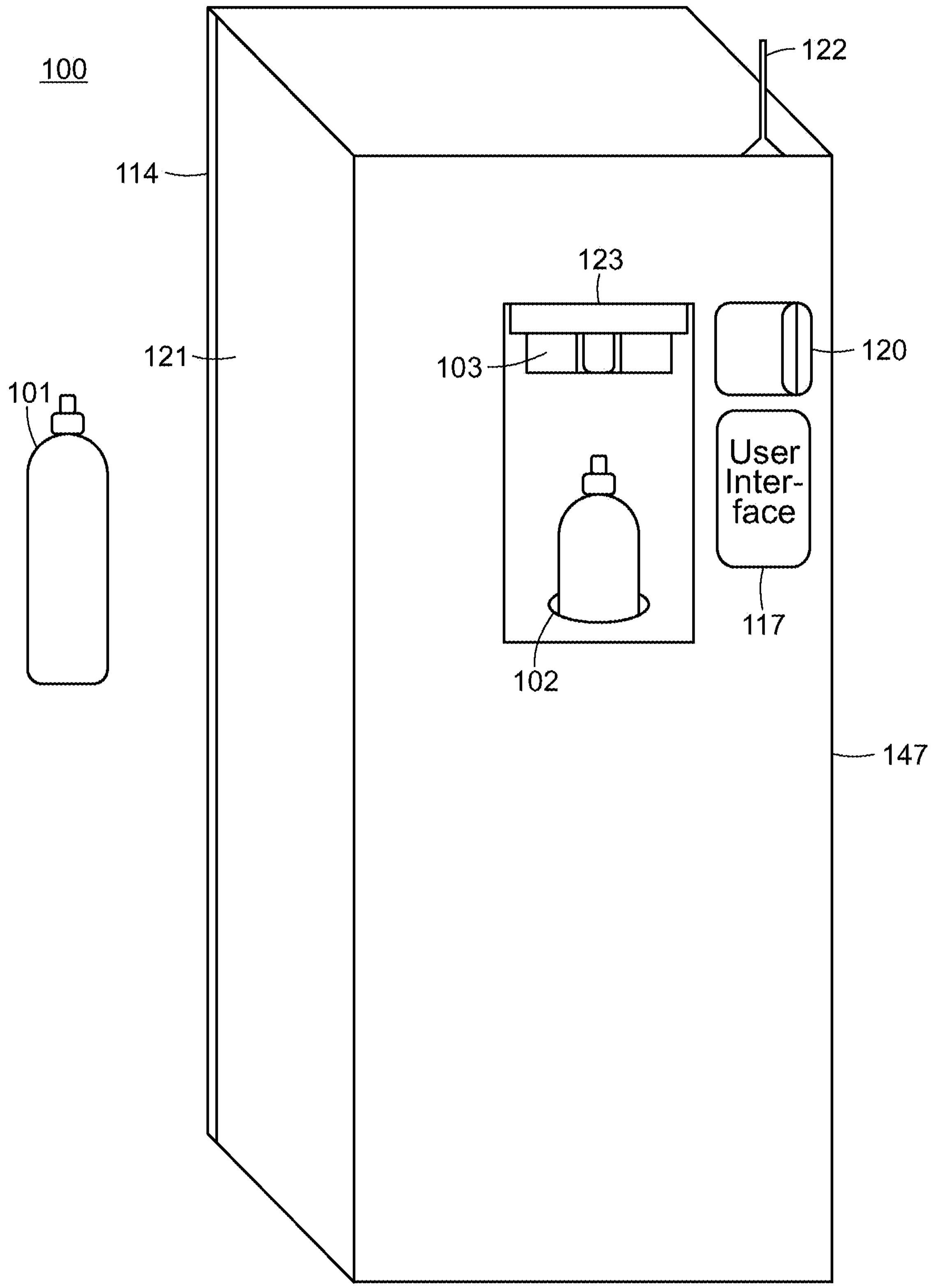
FIG. 6 shows an illustration of an embodiment of the present invention wherein a refill tank has been placed in the holder.
Figure 7:
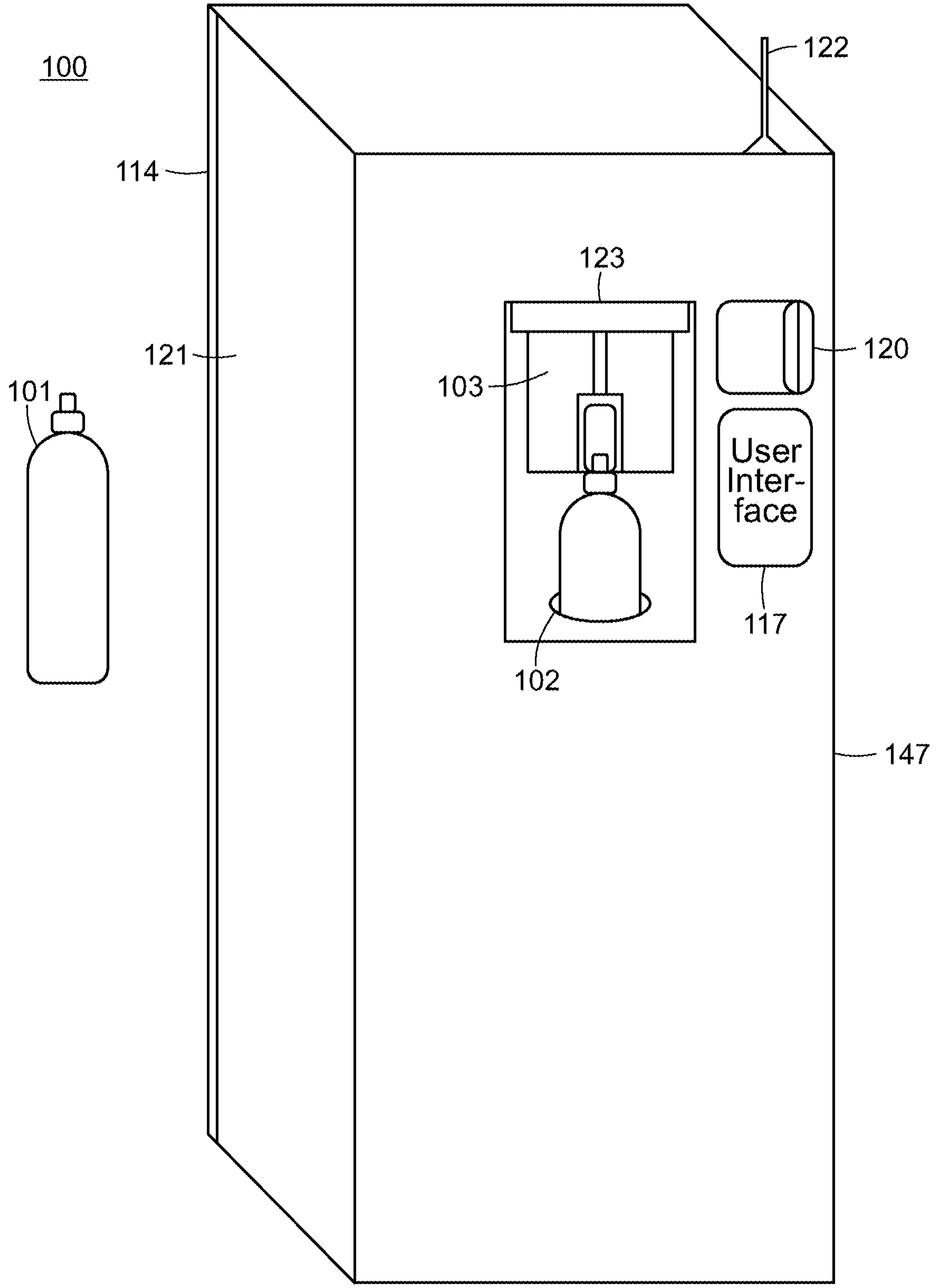
FIG. 7 shows an illustration of an embodiment of the present invention wherein the filling head is connected to the refill tank.

FIGS. 5-7 show various illustrations of an embodiment of the present invention in various states of use, when fluid filling station 100 is enveloped by housing 147. Housing 147 serves a number of different purposes and frequently features a front face, a right face, a left face, a back face, and a top face. One such purpose is to house the internals of fluid filling station 100 such that they cannot be tampered with by a third party. This is particularly important as by their very nature, any containers that house pressurized fluids are inherently dangerous. Additionally, housing 147 can add aesthetic appeal to fluid filling station 100. In many embodiments where fluid filling station 100 is equipped with housing 147, it is frequently equipped with access panel 121, safety door 123, antenna 122, credit card swipe 120, a display showing user interface 117, and an exposed at least one filling head 103. In a preferred embodiment credit card swipe 120, and safety door 123 are disposed on the front face. Preferably, access panel 121 is disposed on the right face, but the left face is equally acceptable provided that access panel 121 allows for supply tank to be accessed easily. In another embodiment, antenna 122 is disposed on the top face of housing 147. Antenna 122 allows the radio communications controller to have greater signal. Preferably, antenna 122 is optimized to receive and transmit Wi-Fi and LTE radio frequencies.

Figure 8:
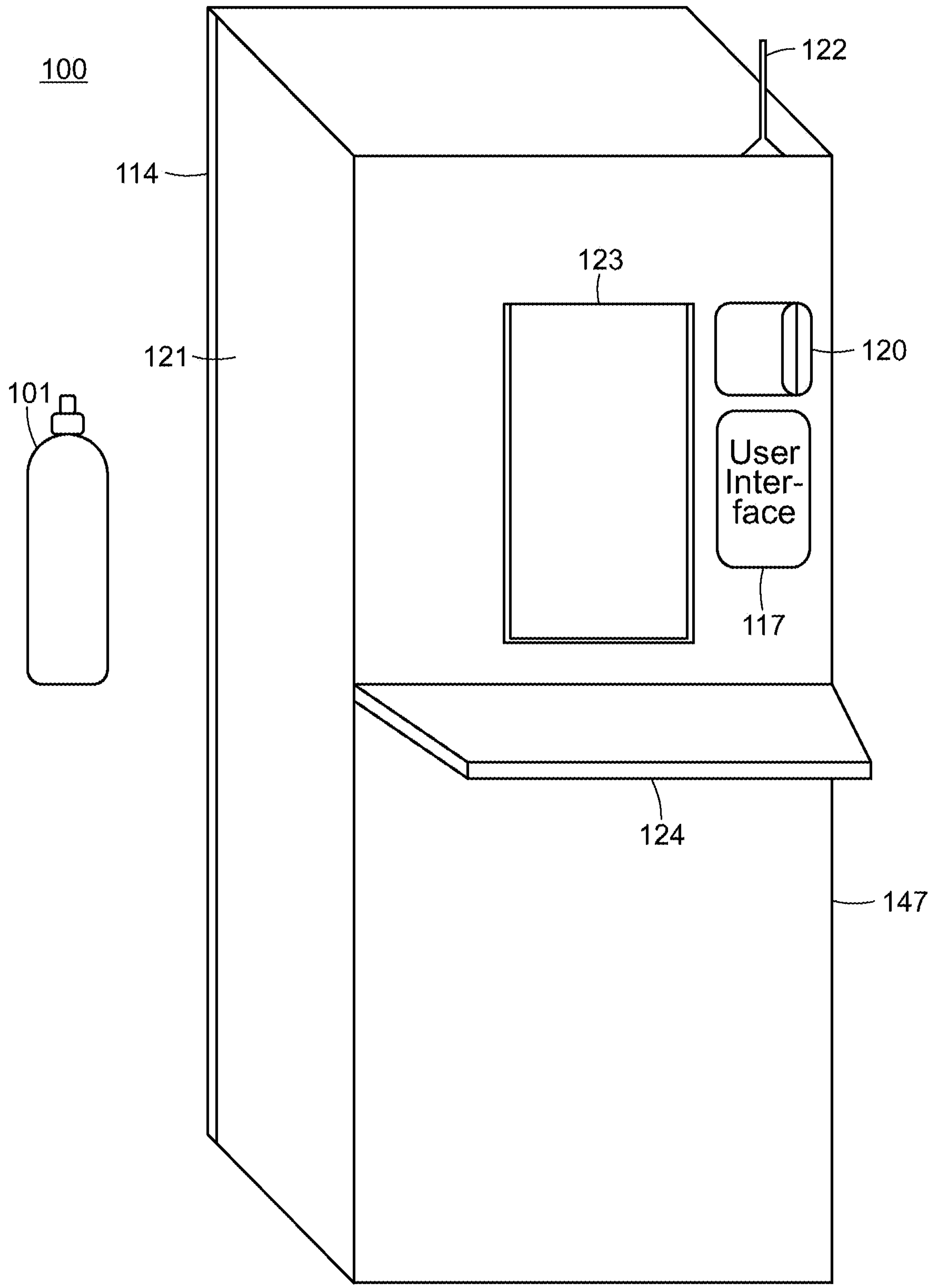
FIG. 8 shows an illustration of an embodiment of the present invention with the safety door closed.

Referring to FIG. 8, an illustration of an embodiment of the present invention with the safety door closed is shown. Similarly to FIGS. 5-7, fluid filling station 100 is enveloped by housing 147, which here is disposed with access panel 121, safety door 123, antenna 122, credit card swipe 120, and a display showing user interface 117. However, unlike those embodiments, housing 147 is equipped with shelf 124. In an alternative embodiment, shelf 124 resembles a table. FIG. 8 also shows safety door 123 in the closed position. Safety door 123 will retain this position while fluid filling station 100 is actively filling refillable fluid container 101. This is important because safety door 123 blocks access to refillable fluid container to prevent users from touching or moving it during the filling process. In a preferred embodiment, once safety door 123 is closed, at least one tank gripper 135 secures refillable fluid container 101 to holder 102.

Figure 9:
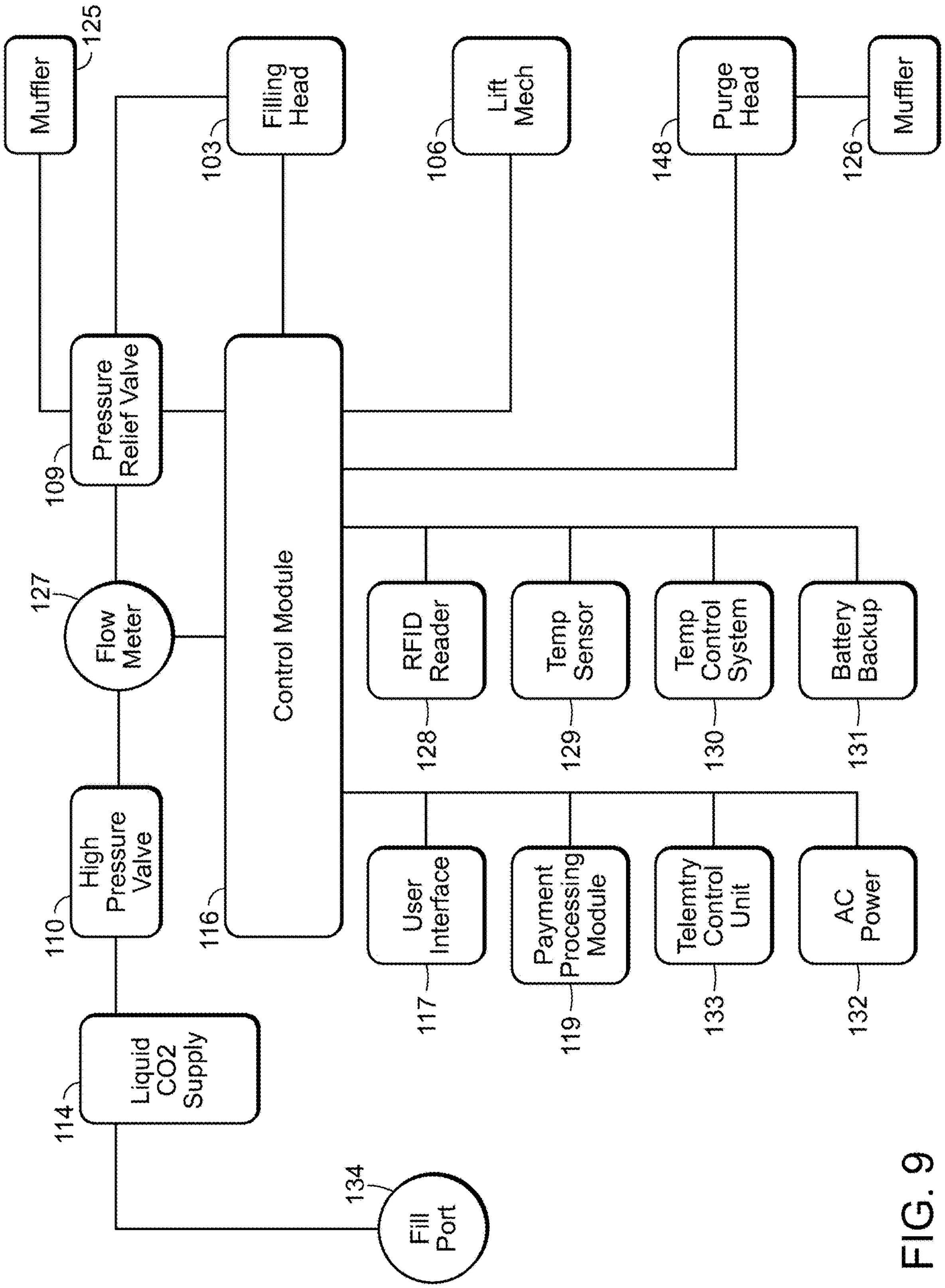
FIG. 9 shows an illustration of a flow chart of a schematic of an embodiment of the present invention.

FIG. 9 shows an illustration of a flow chart of a schematic of an embodiment of the present invention. Here, control module 116 is highlighted. As can be seen from the figure, control module 116 is in electronic communication with fill port 134, supply tank 114, high pressure valve 110, flow meter 127, pressure relief valve 109, at least one filling head 103, lift mechanism 106, purge head 148, first muffler 125, second muffler 126, user interface 117, RFID reader 128, payment processing module 119, temperature sensor 129, telemetry control unit 133, temperature control system 130, power source 132, and battery backup 131. In a preferred embodiment, power source 132 is capable of generating alternating current. It should be noted that not all embodiments that feature control module 116 are equipped with fill port 134. As is discussed later, fill port 134 is only for use with a bulk-sized supply tank (See FIG. 13).

Figure 10A:
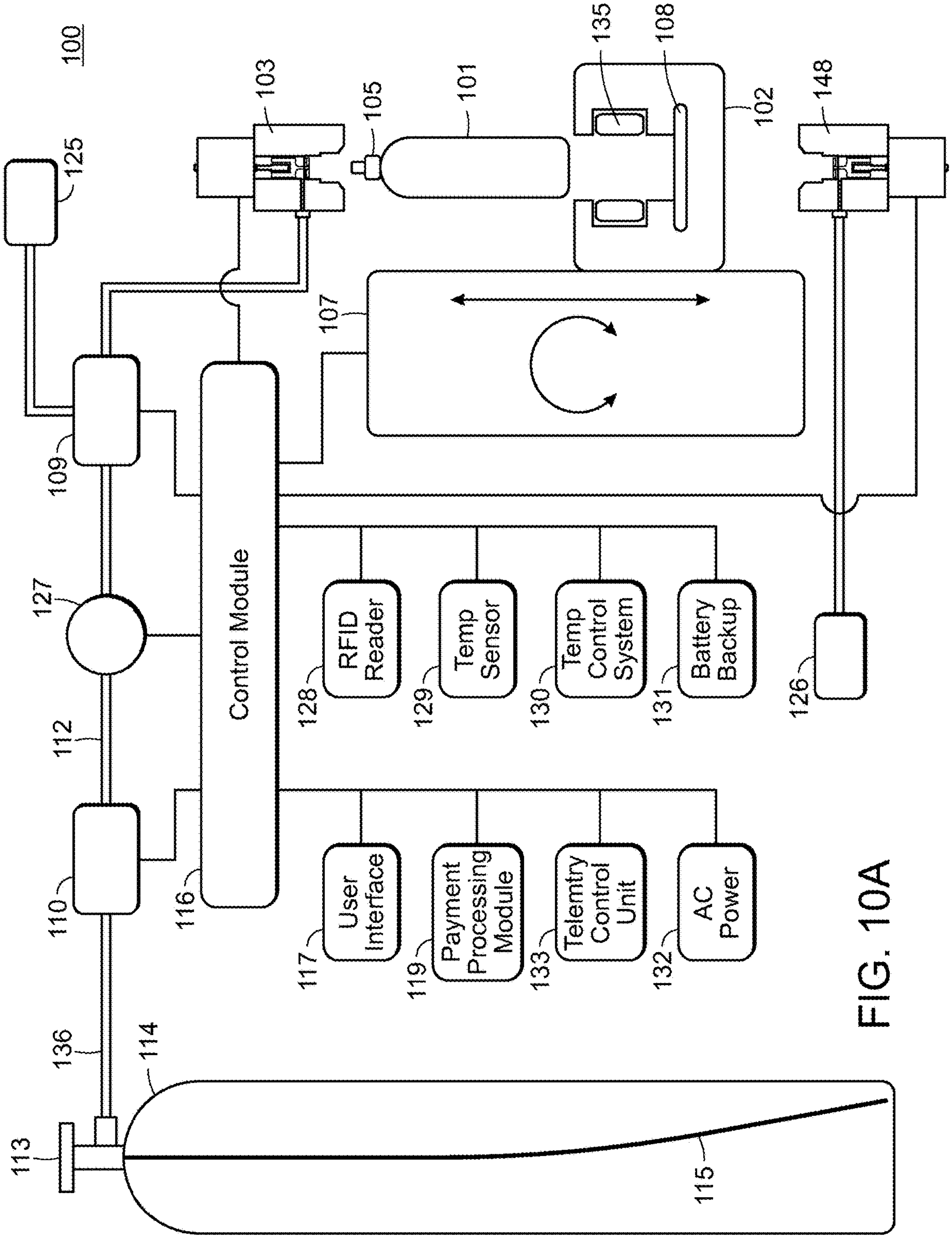
FIGS. 10A-10C show an illustration of an alternative embodiment of the present invention in various positions, illustrating the refilling of a refillable fluid container.
Figure 10B:
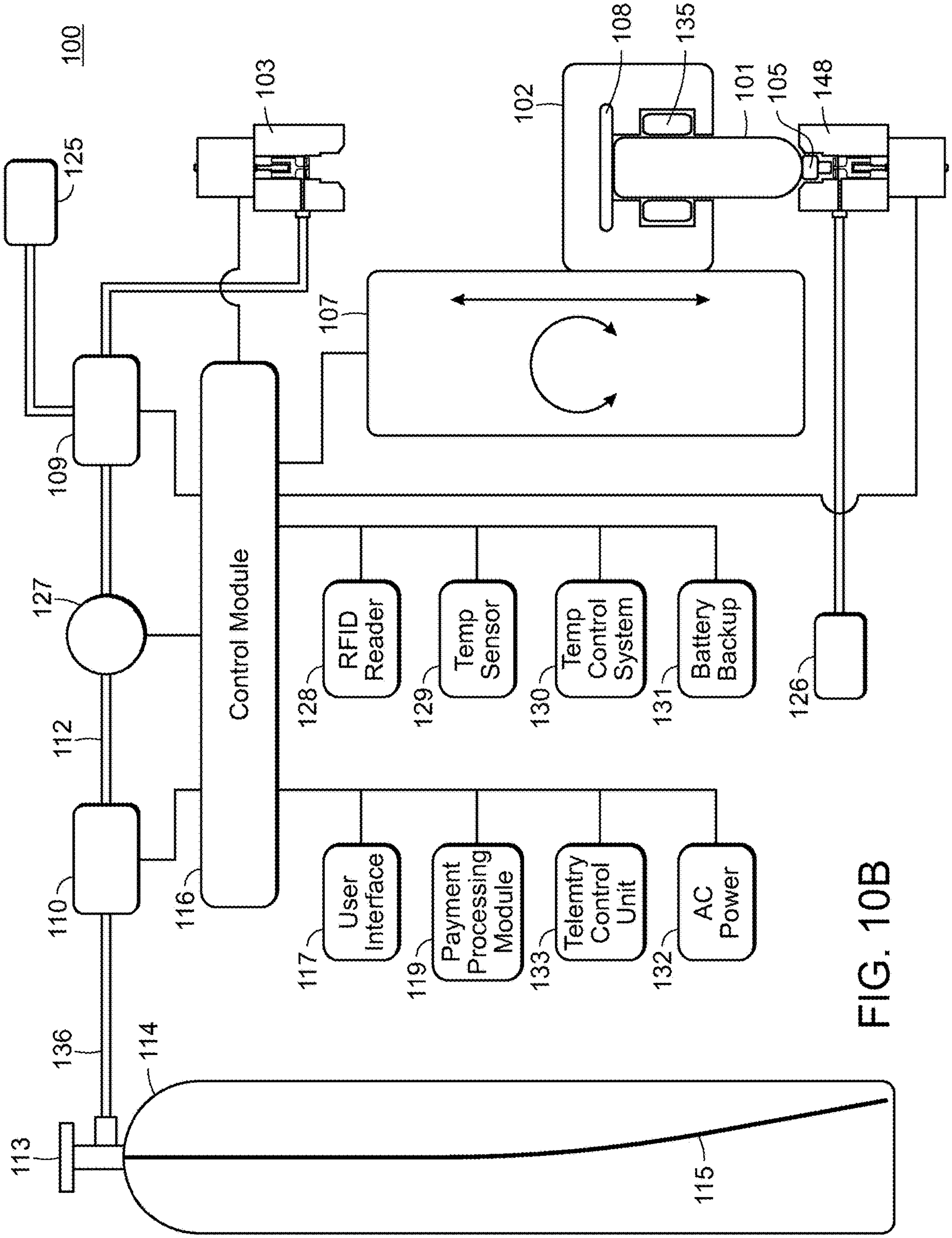
Figure 10C:
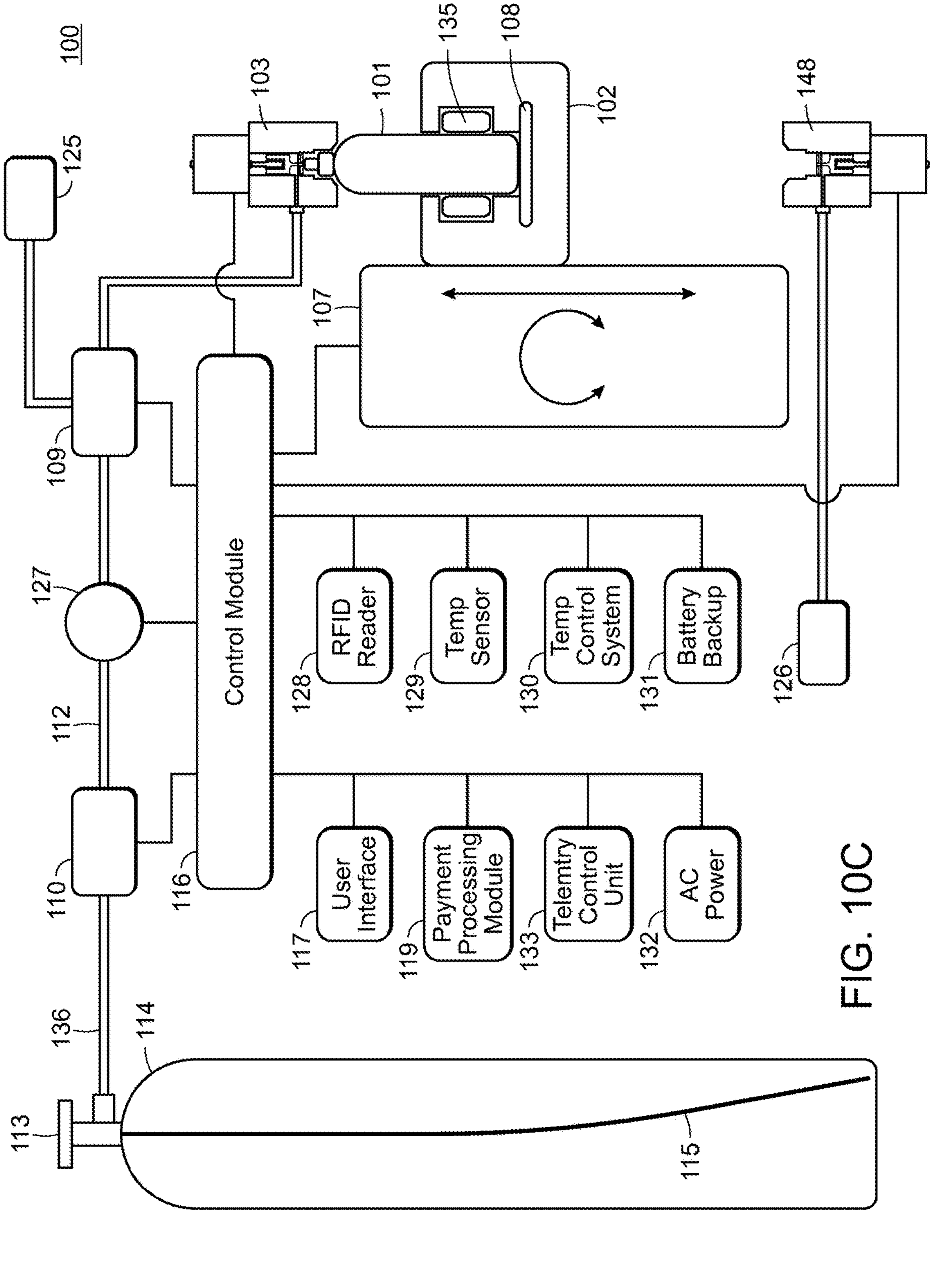

Referring to FIGS. 10A-10C, illustrations of an alternative embodiments of the present invention in various positions, illustrating the refilling of a refillable fluid container is provided for. These figures all show fluid filling station 100 equipped with holder 102, at least one filling head 103, pin valve 105, lift and rotation mechanism 107, scale 108, pressure relief valve 109, high pressure valve 110, tubing 112, tank valve 113, supply tank 114 equipped with siphon tube 115, control module 116, user interface 117, payment processing module 119, first muffler 125, second muffler 126, flow meter 127, RFID reader 128, temperature sensor 129, temperature control system 130, battery backup 131, power source 132, telemetry control unit 133, and at least one tank gripper 135. Of note here is the inclusion of purge head 148, first muffler 125 and second muffler 126. The structure of purge head 148 is very similar to that of at least one filling head 103. That is, both filling head 103 and purge head 148 are capable of discharging the pressure inside refillable fluid container. First muffler 125 is in fluid communication with filling head 103 such that the sound generated when filling head 103 is in use will be greatly diminished. The same is true regarding second muffler 126, which is in fluid communication with purge head 148 and is capable of greatly reducing the sound emitted when purge head 148 is in use. Lift and rotation mechanism 107 differs from lift mechanism 106 (See FIG. 1) in that it is capable of rotating holder 102 such that refillable fluid container 101 can be inserted into filling head 103 or purge head 148.

In a preferred embodiment, when a user places refillable container 101 into fluid filling station 100, CPU 116 runs a diagnostic on the cylinder via the RFID Reader 128 to obtain data needed for filling/refilling. RFID reader 128 communicates with refillable fluid containers' 101 electronic identifier 145 to create a two-way communication to exchange data. User interface 117 on fluid filling station 100 indicates to the user that refillable fluid container is valid and can be filled/refilled. The user supplies payment with, but not limited to cash, credit, debit, gift card, Apple Pay, Android Pay, Google Wallet, or digital cryptocurrency through payment processing module 119 which connects to the internet via telemetry control unit 133 to a secure processing facility, and upon receiving approval from said processing facility, begin to go into action. At this point tank gripper 135 locks refillable fluid container 101 into holder 102, and then, via lift and rotation mechanism 107, rotates 180-degrees inverting refillable fluid container 101. Holder 102 then lowers refillable fluid container 101 until pin valve 105 engages purge head 148. Preferably, purge head 148 contains a sleeve actuated connector or similar type quick connector that engages with pin valve 105, locking them together or simply holding them together via pressure from the lift mechanism. Once pin valve 105 and purge head 148 are engaged, plunger lift mechanism 142 (See FIG. 17A) operates to lower plunger 141 to depress pin valve 105 making the two pieces become fluidly connected. As a result, any remaining fluid in refillable fluid container 101 is purged out of the cylinder through muffler 126. Once refillable fluid container 101 is purged, plunger lift mechanism 142 (See FIG. 17A) raises plunger 141, closing pin valve 105. Then, sleeve actuated connector 104 disengages from pin valve assembly 105, releasing it. Next, holder 102 raises refillable fluid container 101 until pin valve 105 dis-engages from purge head 148. Next, holder 102, via lift and rotation mechanism 107, rotates 180-degrees up righting refillable fluid container 101. Holder 102 then raises refillable fluid container 101 until pin valve 105 engages filling head 103. Once pin valve 105 and filling head 103 are engaged, plunger lift mechanism 142 (See FIG. 17A) operates to lower plunger 141 to depress pin valve 105 making the two pieces become fluidly connected. Now, CPU 116 opens high pressure solenoid valve 110 allowing the fluid contained in supply tank 114 to flow into refillable fluid container 101. The flow of the fluid can be measured by weight in the refill tank using scale 108, by special flow meter 127 or by other measuring types. Once the predetermined pressure/weight/quantity has been reached, CPU 116 closes the high pressure solenoid valve 110 stopping the flow of the liquid phase of the fluid from supply tank 114. Once refillable fluid container 101 is filled, plunger lift mechanism 142 (See FIG. 17A) raises plunger 141, closing pin valve 105. At this point CPU 116 communicates with the pressure relief valve 109, opening it to relieve the excess pressure in tubing 112. Then, sleeve actuated connector 104 disengages from pin valve assembly 105, allowing refillable fluid container 101 to disengage from filling head 103. Once complete, holder 102 lowers refillable fluid container 101 downward until refillable fluid container 101 is back to its original positon. At this is point safety door 123 (See FIG. 5) opens allowing access to refillable fluid container 101. The process is complete and the user takes their cylinder. In a preferred embodiment, supply tank 114 is in fluid communication with high pressure valve 112 via tank connector 136. In another preferred embodiment, tank valve is a CGA-320 valve. It should also be noted that the supply tank 114 is preferably a Siphon Type $CO_2$ tank. This type of tank has an internal suction tube or "dip-tube" which runs from the tank valve 113 (internally) to the bottom of supply tank 114 so it dispenses the liquid phase of the fluid from the bottom of the tank.

Figure 11:
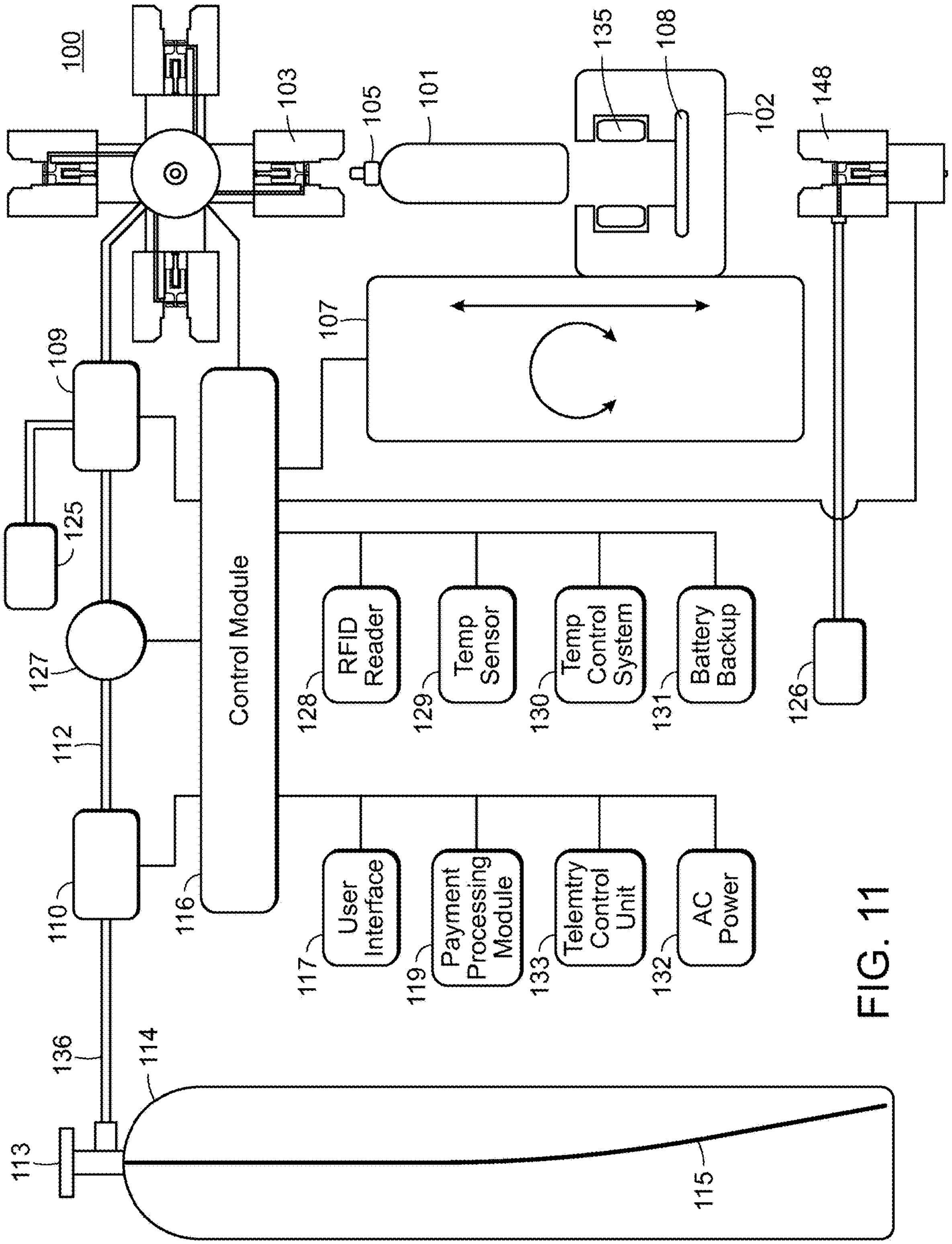
FIG. 11 shows an illustration of another alternative embodiment of the present invention, showing multiple filling heads connected by a circular rotation mechanism.

FIG. 11 shows an illustration of another alternative embodiment of the present invention, showing multiple filling heads connected by a circular rotation mechanism. Similarly to FIGS. 10A-10C, fluid filling station 100 is equipped with holder 102, at least one filling head 103, pin valve 105, lift and rotation mechanism 107, scale 108, pressure relief valve 109, high pressure valve 110, tubing 112, tank valve 113, supply tank 114 equipped with siphon tube 115, control module 116, user interface 117, payment processing module 119, first muffler 125, second muffler 126, flow meter 127, RFID reader 128, temperature sensor 129, temperature control system 130, battery backup 131, power source 132, telemetry control unit 133, and at least one tank gripper 135.

In a preferred embodiment, the present invention is equipped with a plurality of filling heads 103, which are rotatably connected. In one embodiment, each filling head 103 is configured to receive a different type of refillable fluid container.

In another preferred embodiment, control module 116 collects user data from the current filling session and sends it through the internet to an external server, which stores information about a user's activity and account. By way of non-limiting example, a user that uses the present invention would have created an online account on this external website when they purchased the present invention. This account serves as a portal for all user data and is shared among several methods and devices including but not limed to the present invention and other internet-enabled devices.

Figure 12:
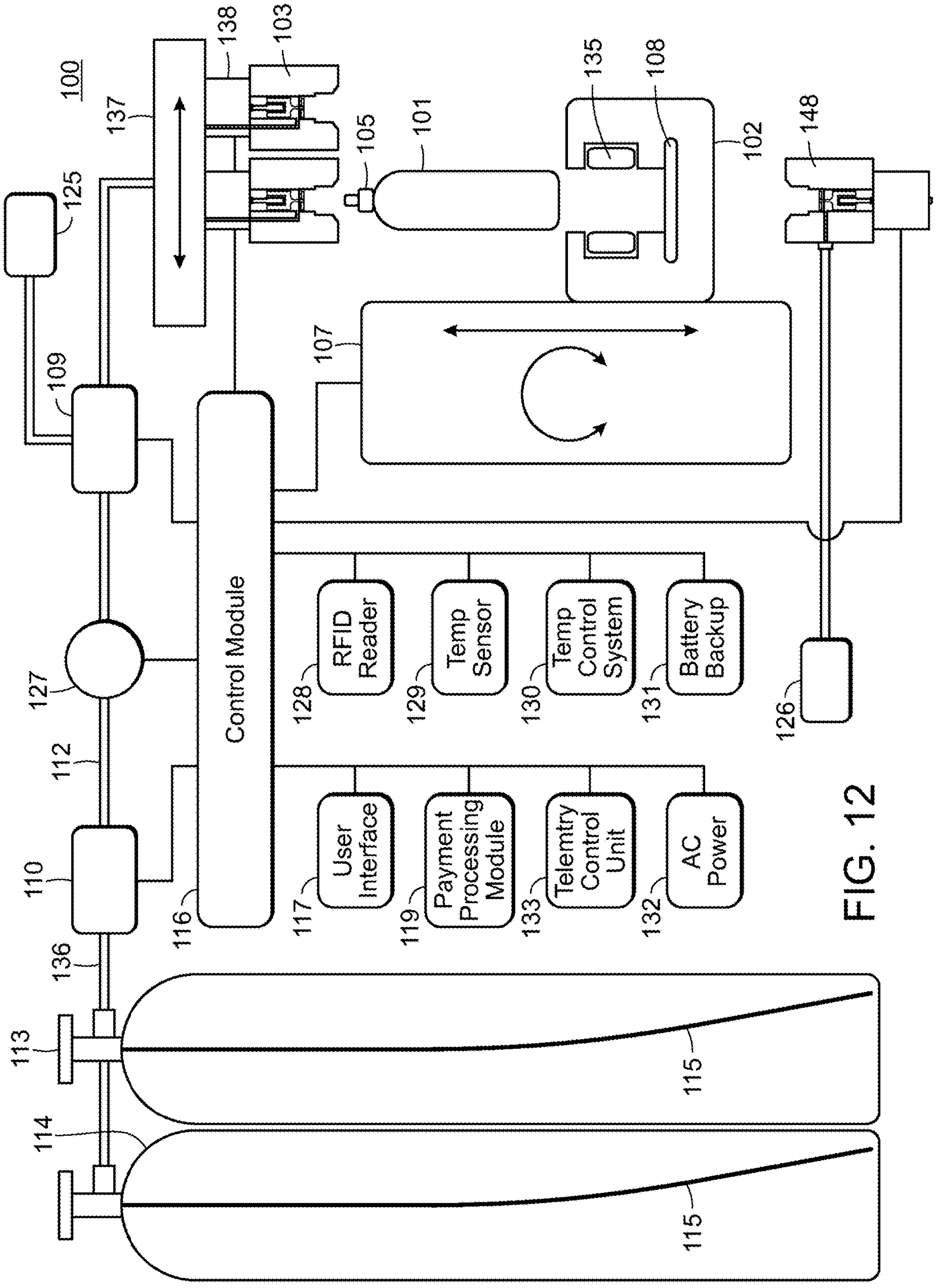
FIG. 12 shows an illustration of yet another alternative embodiment of the present invention having dual supply tanks and multiple filling heads connected via a slide mechanism.

FIG. 12 shows an illustration of yet another alternative embodiment of the present invention having dual supply tanks and multiple filling heads connected via a slide mechanism. Once again, fluid filling station 100 is equipped with holder 102, at least one filling head 103, pin valve 105, lift and rotation mechanism 107, scale 108, pressure relief valve 109, high pressure valve 110, tubing 112, tank valve 113, supply tank 114 equipped with siphon tube 115, control module 116, user interface 117, payment processing module 119, first muffler 125, second muffler 126, flow meter 127, RFID reader 128, temperature sensor 129, temperature control system 130, battery backup 131, power source 132, telemetry control unit 133, and at least one tank gripper 135.

This particular embodiment shows two separate supply tanks 114. This is preferable as the present invention would have to be serviced less frequently as a greater supply of the fluid is available. In addition to the dual-supply tanks, the embodiment depicted here further comprises a manifold 138, and a slide mechanism 137 to support multiple filling heads 103. The manifold allows each of the filling heads 103 to be in fluid connection with supply tank 114.

Figure 13:
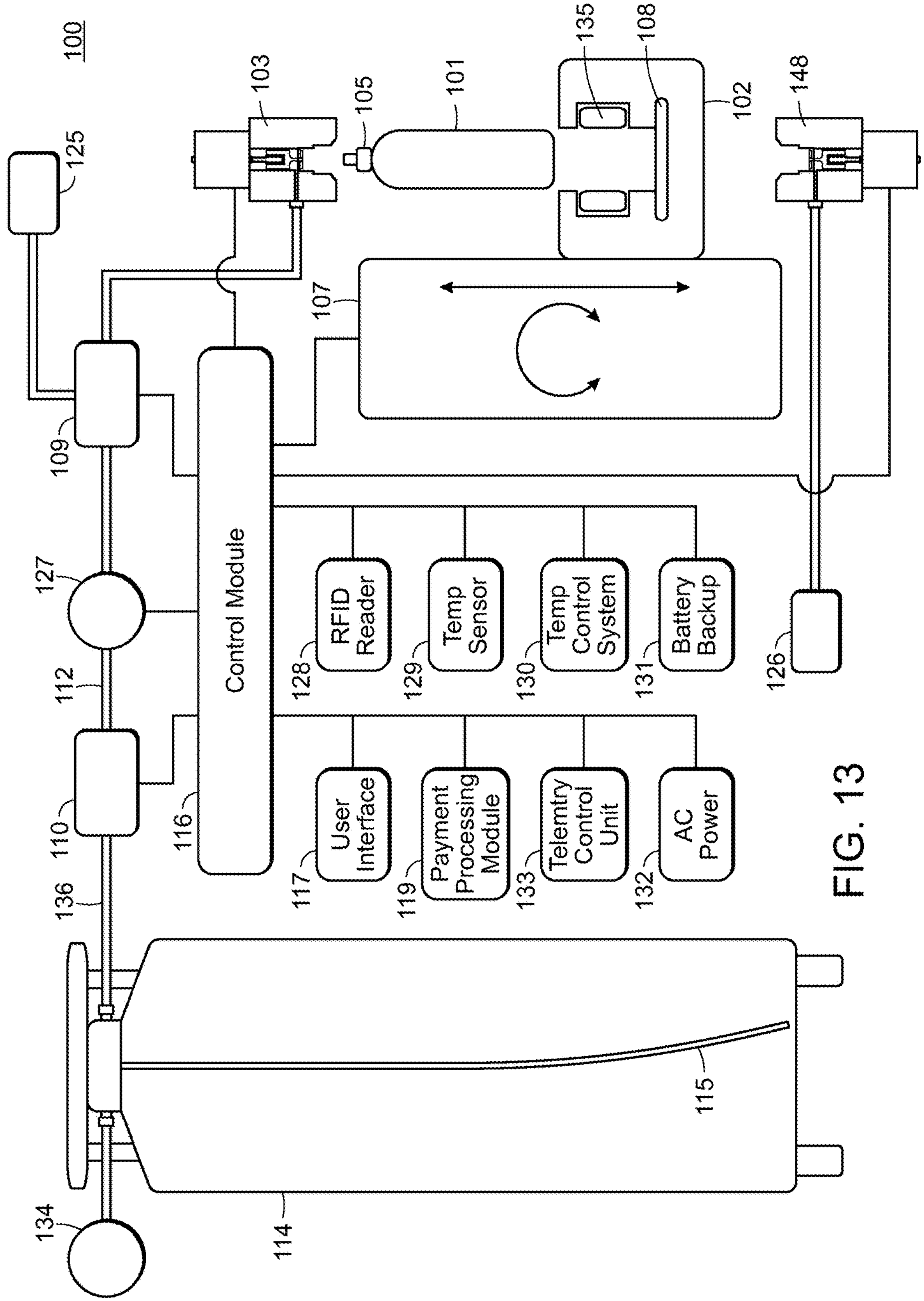
FIG. 13 shows an embodiment of the present invention equipped with a bulk-sized supply tank.
Figure 14:
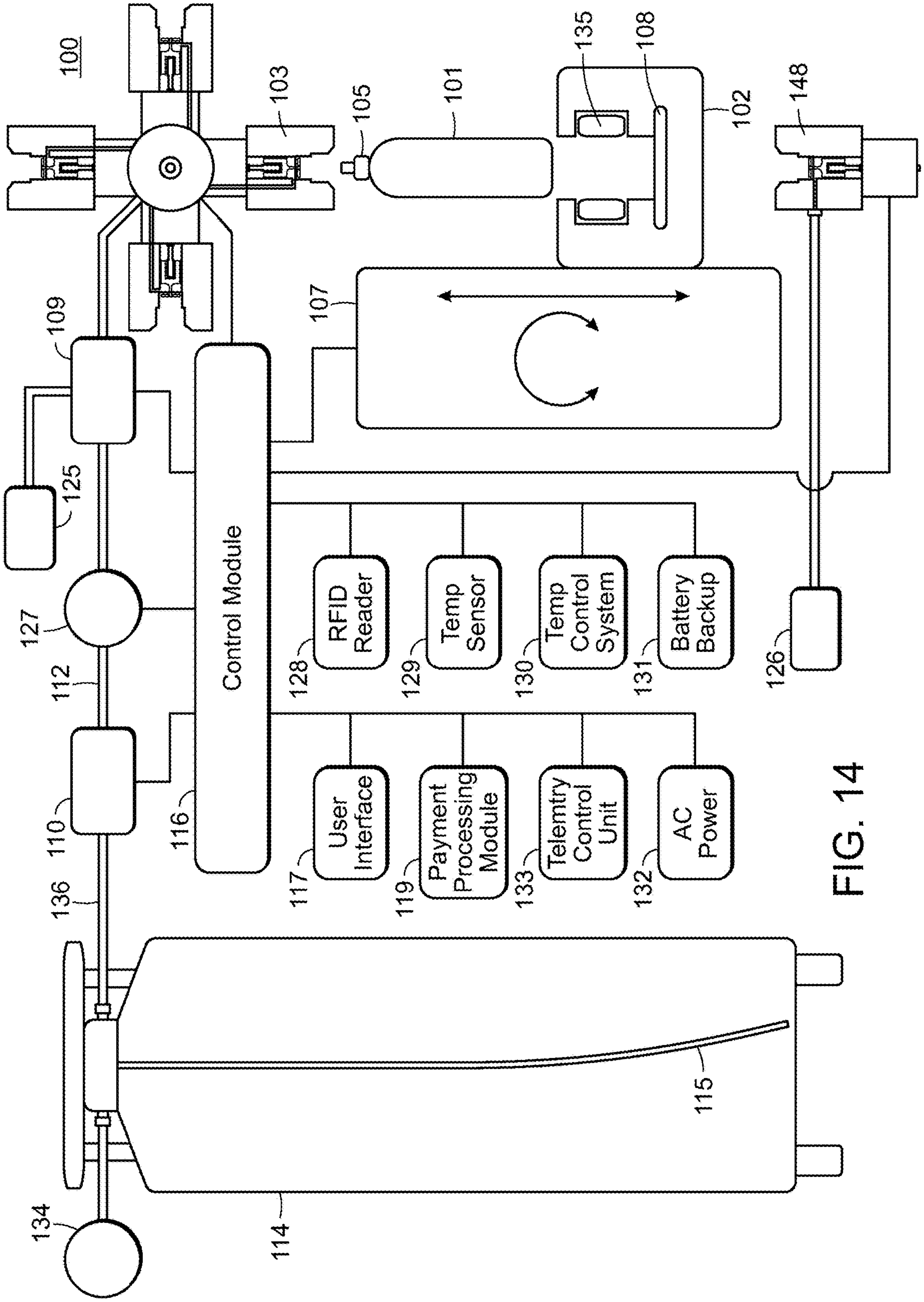
FIG. 14 shows an illustration of an alternative embodiment of the present invention, showing multiple filling heads connected by a circular rotation mechanism with a bulk-sized supply tank.
Figure 15:
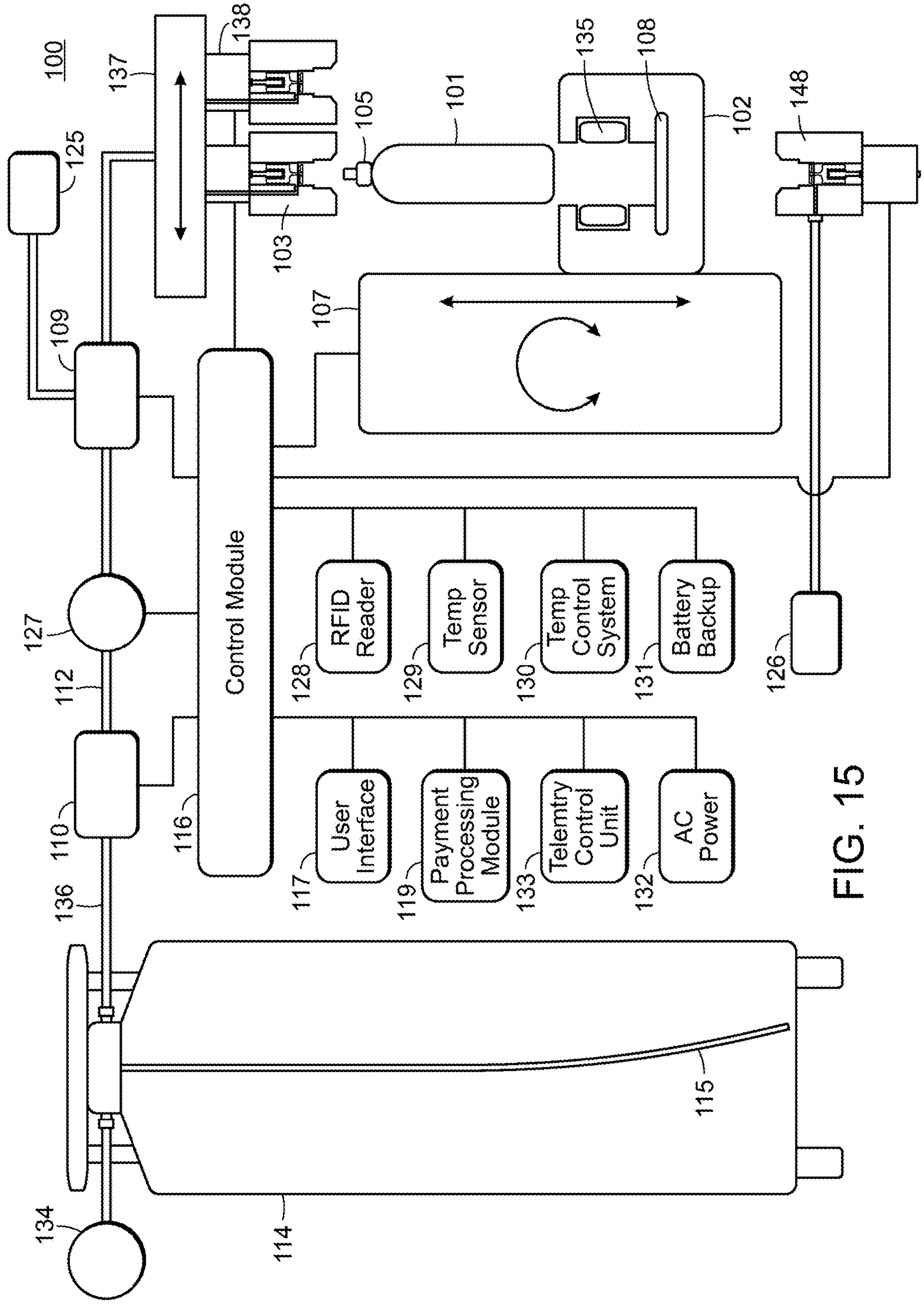
FIG. 15 shows an illustration of yet another alternative embodiment of the present invention having a bulk-sized supply tank and multiple filling heads connected via a slide mechanism.

FIGS. 13-15 show embodiments of the present invention, all of which are equipped with a bulk-sized supply tank. This bulk-sized supply tank provides benefits over the replaceable supply tanks incorporated into the previously disclosed embodiments. This bulk-sized supply tank further comprises fill port 134. For this reason, this type of supply tank may remain stationary and can be filled remotely. Preferably, a modified Carbo-Mizer® 750 bulk container will be used as supply tank 114. The various figures show that the bulk-sized supply tank is compatible with all of the variations and amounts of filling heads 103 previously taught by the present disclosure.

Figures 16A, 16B, 16C:
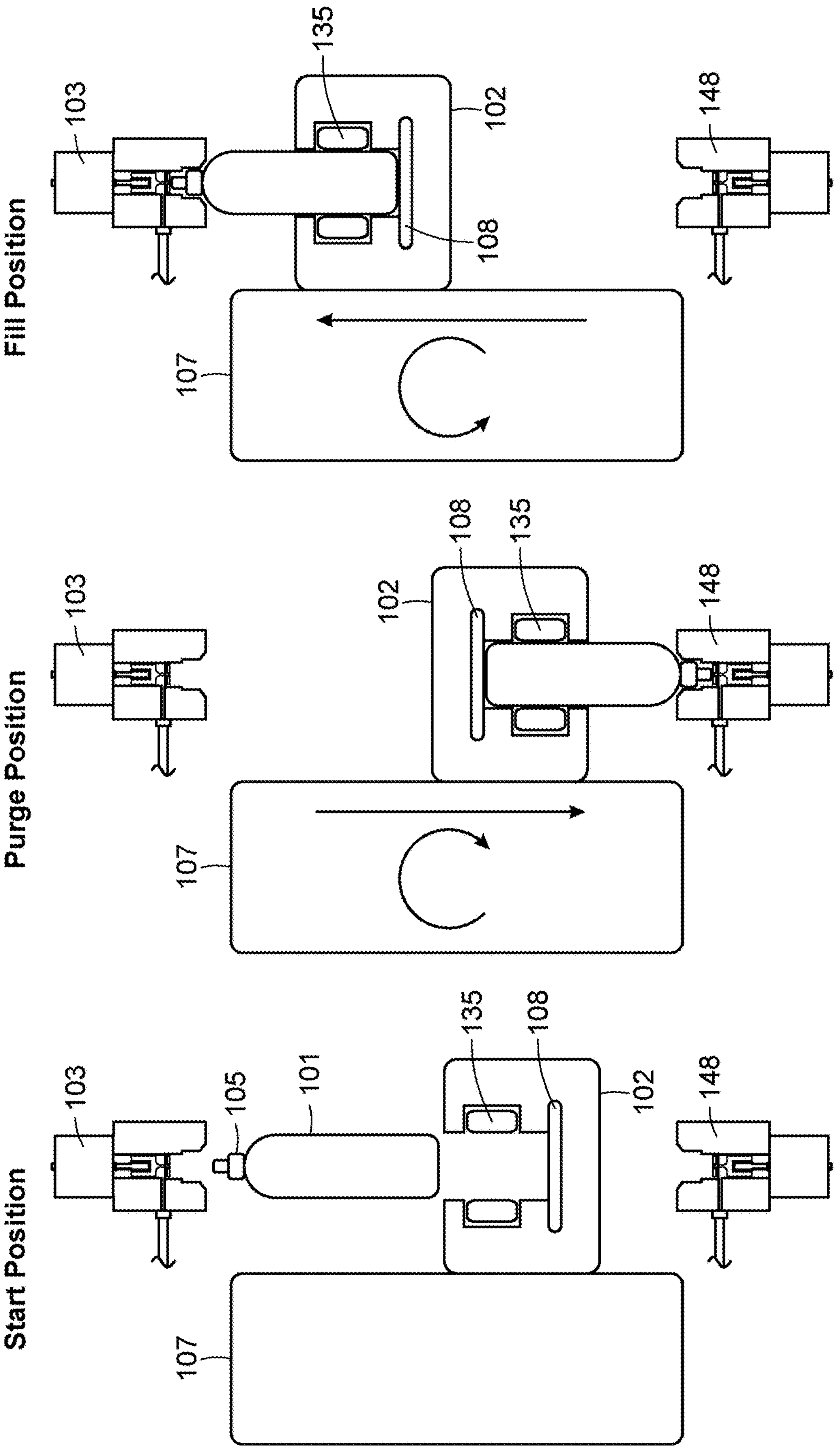
FIGS. 16A-16C show an illustration of the lift and rotation mechanism of the present invention in various positions.

FIGS. 16A-16C show an illustration of the lift and rotation mechanism of the present invention in various positions. FIG. 16A shows the start position of lift and rotation mechanism 107. Here at least one filling head 103, at least one tank gripper 135, scale 108, and holder 102 are shown. FIG. 16B shows the purge position. This is achieved by placing refillable fluid container 101 into holder 102. At least one tank gripper 135 then secures refillable fluid container 101 into holder 102, and lift and rotation mechanism 107 inverts refillable fluid container 101 and inserts pin valve 105 into purge head 148. Purge head 148 then purges any remaining fluid from refillable fluid container 101. Then, purge head 148 disengages pin valve 105 and lift and rotation mechanism lifts and rotates refillable fluid container 101 such that pin valve 105 is then inserted into at least one filling head 103 as shown in FIG. 16C.

The connection between at least one filling head 103 and refillable fluid container 101 can be executed by, but should not be limited to, sleeve actuated connecter 104, a screw connection, a clamping mechanism, a pressure-sealing mechanism, or another, not explicitly mentioned mechanism. In another embodiment, refillable fluid container 101 can have male or female threads, no treads, or a proprietary connection.

Figure 17C:
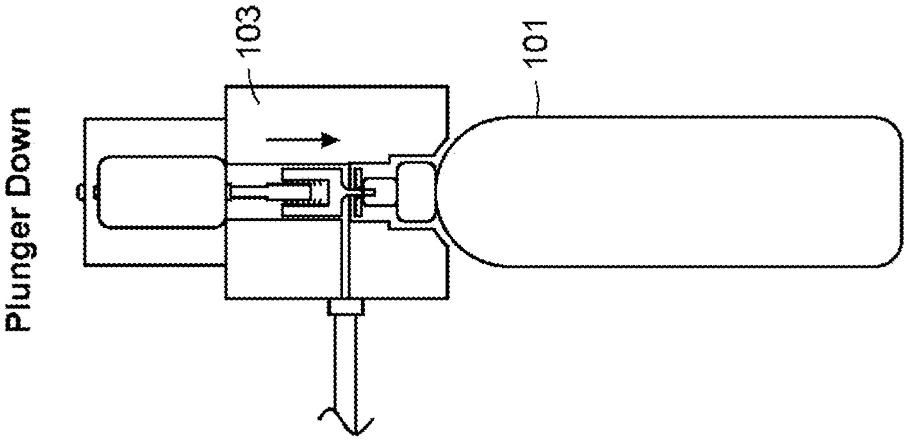
FIGS. 17A-17C show an illustration of the various positions of an embodiment of the plunger lift and press mechanism of the present invention.
Figure 17B:
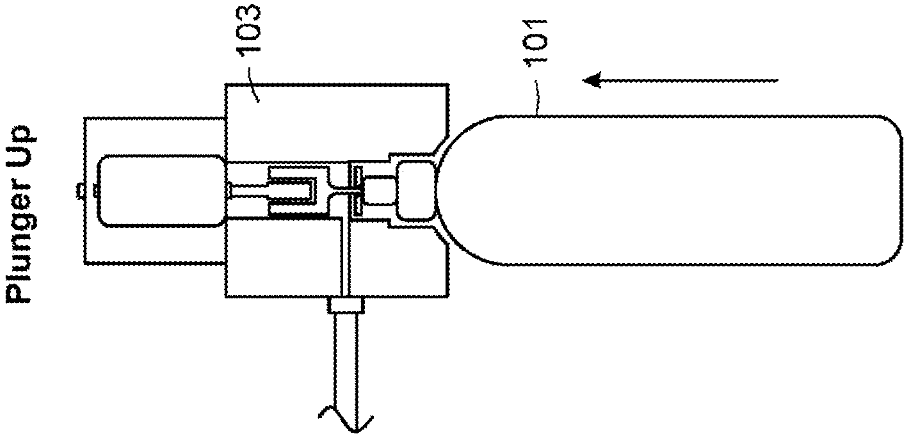
Figure 17A:
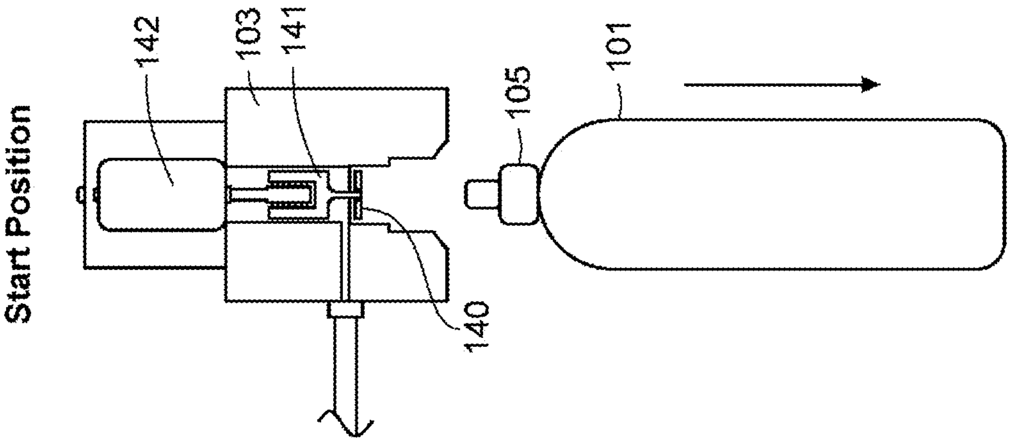

FIGS. 17A-17C show an illustration of the various positions of an embodiment of the plunger lift and press mechanism of the present invention inside filling head 103 and purge head 148. This process is the same for both purge and fill positions. In purge state liquid/gas is being evacuated from refillable fluid container 101 and in fill state liquid/gas is being entered into refillable fluid container 101.

In a preferred embodiment, once pin valve 105 and purge head 148 (See FIG. 16C) are engaged, the two pieces become fluidly connected and plunger lift mechanism 142 operates to lower plunger 141 to depress pin valve 105 to allow any remaining fluid in refillable fluid cylinder to be purged out of the cylinder. Second muffler 126 in fluid connection with the purge line helps keep this process quiet. In addition, muffler 125 and muffler 126 can employ a carbon dioxide filtration system to reduce the amount of $CO_2$ released by the filling station during normal use. Such a filtration system may include, but not limited to, photosynthesis with simple chemical reactions, activated carbon filtration and sodium hydroxide to name a few. For example, a disposable filter that contains multiple chambers containing sodium hydroxide will react with $CO_2$ gas to form sodium carbonate. This solution then flows into the next chamber to mix with lime to precipitate powdered calcium carbonate, otherwise known as a naturally occurring form of limestone. This setup can reduce the amount of $CO_2$ released through the muffler and into the air. Refillable fluid container 101 is purged because a tare weight for refillable fluid container 101 must be obtained prior to filling said container. This is so that the amount of fluid dispensed may be accurately measured. Once refillable fluid cylinder is purged, plunger lift mechanism 142 raises plunger 141, closing pin valve 105. Then, sleeve actuated connector 104 disengages from pin valve assembly 105, releasing it, allowing refillable fluid container to disengage from the purge head 148.

Similarly, once pin valve 105 and at least one filling head 103 are engaged, the two pieces become fluidly connected and plunger lift mechanism 142 operates to lower plunger 141 to depress pin valve 105 to allow the present invention to start refilling refillable fluid container 101. Preferably, at least one filling head 103 and purge head 148 will be equipped with a fluid inlet/outlet to allow fluid to flow to/from said component, and each will preferably be connected with a gasket 140 to assist in forming a tight seal.

Figure 18A:
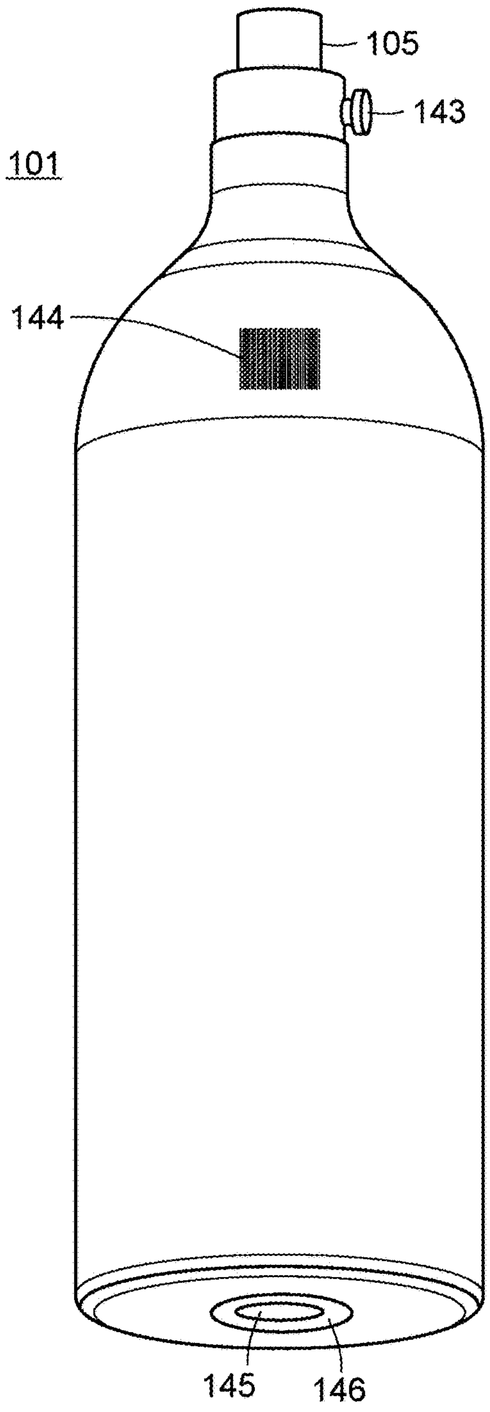
FIGS. 18A & 18B show an illustration of an embodiment of the refillable fluid container of the present invention.
Figure 18B:
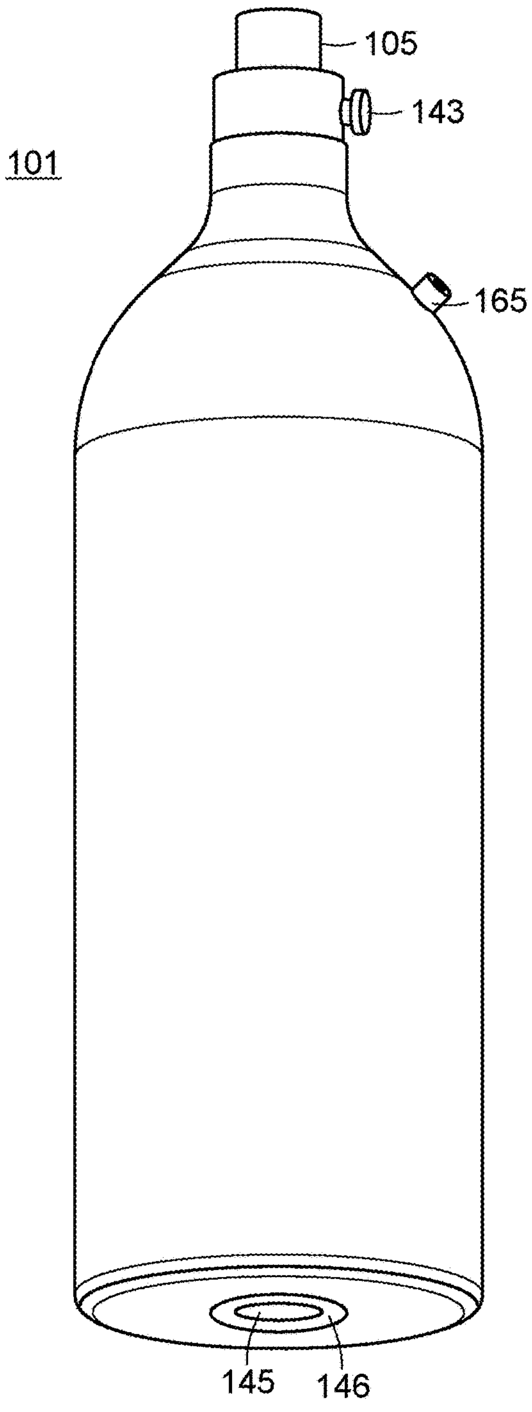

Referring to FIGS. 18A and 18B, an illustration of an embodiment of the refillable fluid container 101 of the present invention is provided for. Here, refillable fluid container 101 has a top, a bottom, and a curved surface and comprises pin valve 105, burst disk 143, optical identifier 144, electronic identifier 145, and recessed area 146 which can include an RF shielding component. It should be noted that while the refillable fluid container 101 is of a particular shape here, many other shapes, both structurally superior and visually pleasing may be incorporated into the design of refillable fluid container 101. It should also be noted that while pin valve 105 is of a particular shape here, many other shapes may be incorporated into the design.

In a preferred embodiment, optical identifier 144 can be a Bar Code printed on the curved surface of refillable fluid container 101. In yet another preferred embodiment, optical identifier 144 is a QR Code. In one embodiment, electronic identifier 145 is an RFID chip. Preferably, this chip is embedded in recessed area 146, which is preferably located at the bottom of refillable fluid container 101.

In one embodiment, optical identifier 144 is for a user to scan. This can be done with a plurality of devices, but is preferably performed with an internet-enabled electronic device such as a smartphone. Scanning this code registers refillable fluid container 101 in the user's personal inventory. This activity is preferably logged and stored by an external server.

Figure 18C:
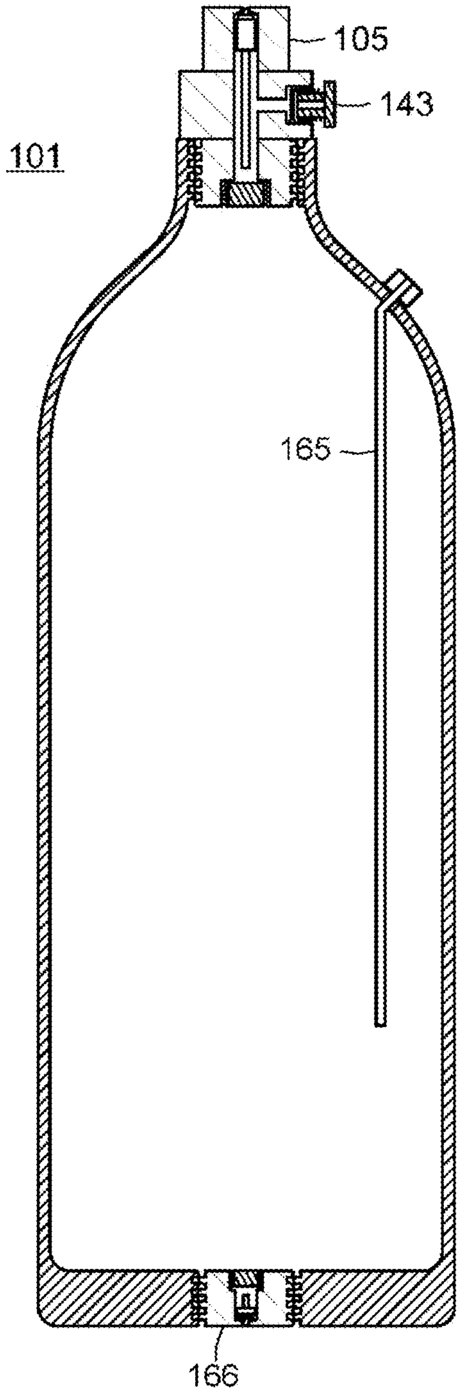
FIGS. 18C & 18D show an alternative embodiment of the refillable fluid container of the present invention.
Figure 18D:
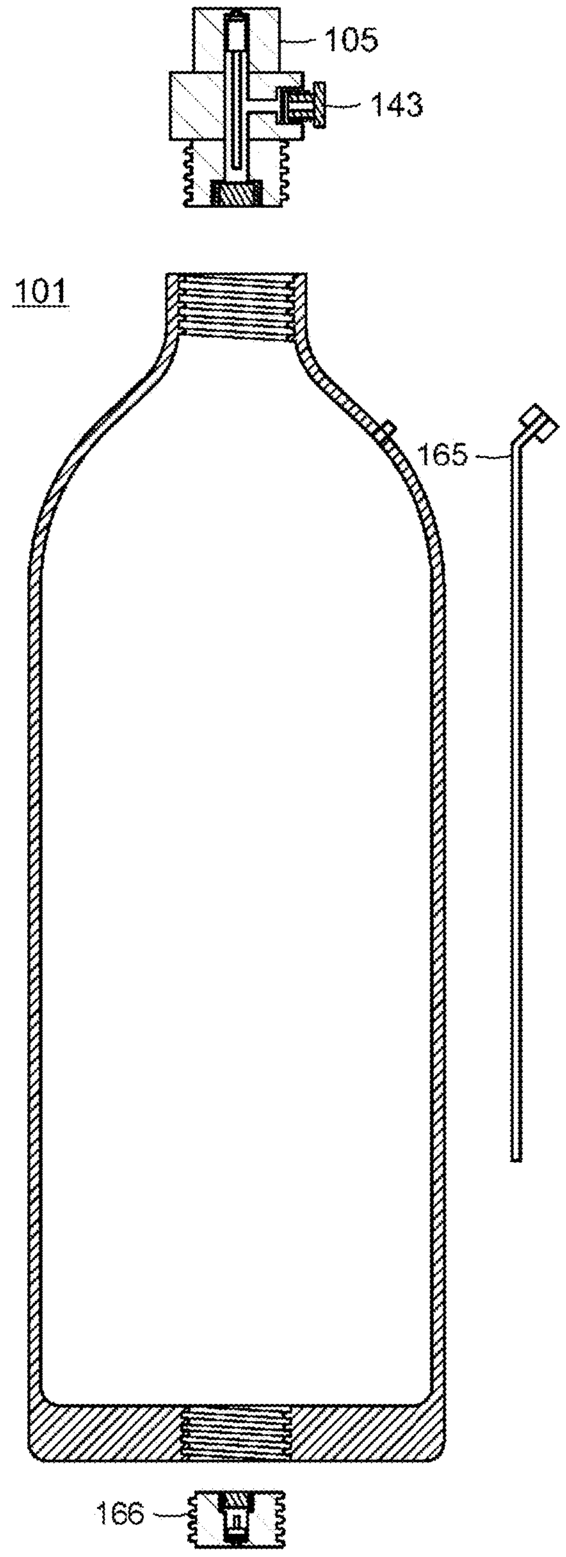

FIGS. 18C and 18D show an alternate embodiment of refillable fluid container 101, featuring purge pin valve 166 on the bottom of the refillable fluid container 101. These FIGS. also show a fluid level sensor 165 on refillable fluid container 101. Fluid level sensor 165 will be used to control the filling process and allow the filling station to communicate with refillable fluid container 101 a specific volume of fluid, preferably liquid $CO_2$. Fluid level sensor 165 may be, for example, a Capacitance-based liquid level sensor, a point-level measurement with vibrating level switches, an ultrasonic level sensor, an optical level sensors, or a similar device.

Figure 18E:
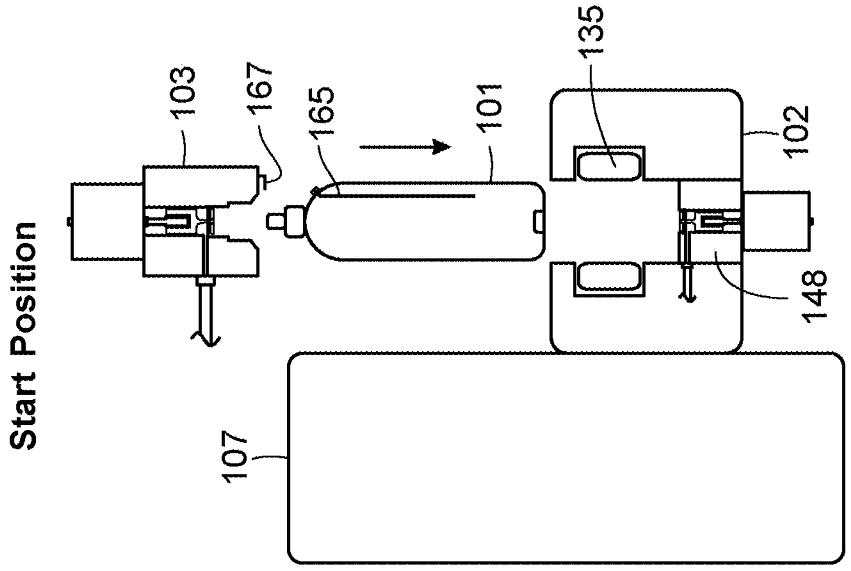
FIGS. 18E-18G show an alternative embodiment of the fluid filling station of the present invention.
Figure 18F:
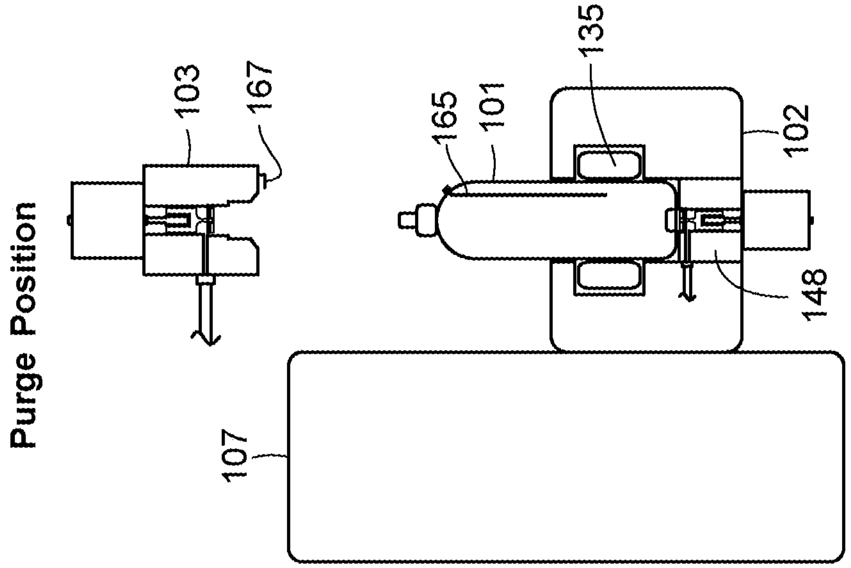
Figure 18G:
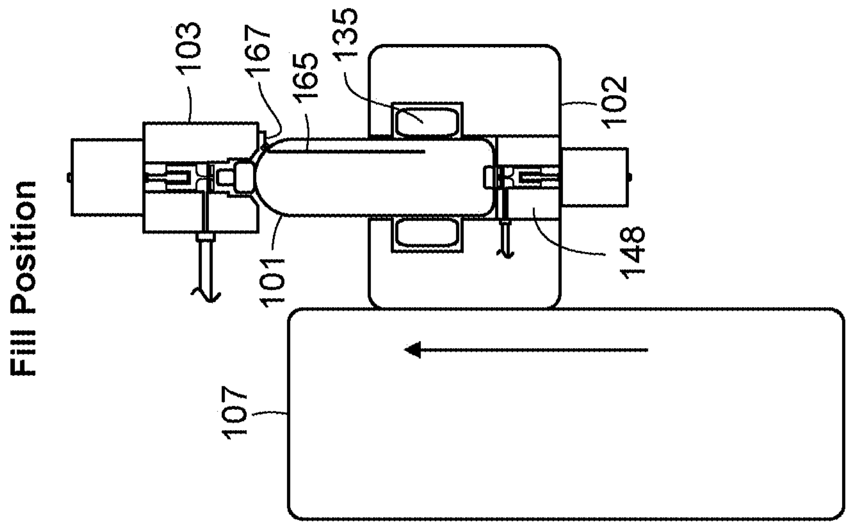

FIGS. 18E-18G shows various positions of an alternative embodiment of the fluid filling station of the present invention. FIG. 18E shows the start position of lift mechanism 107. Here at least one filling head 103, at least one tank gripper 135, holder 102 and purge head 148 are shown. It is important to note that in this embodiment purge head 148 is built into holder 102 and refillable fluid container 101 (See FIG. 18C) has purge valve 166 on the bottom of the cylinder. FIG. 18F shows the purge position. This is achieved by placing refillable fluid container 101 into holder 102 with at least one tank gripper 135 securing refillable fluid container 101 into holder 102. Plunger lift mechanism 142 (See FIG. 17A) operates to raise plunger 141 to depress purge valve 166 making the two pieces become fluidly connected. As a result, any remaining fluid in refillable fluid container 101 is purged out of the cylinder through muffler 126. Once refillable fluid container 101 is purged, plunger lift mechanism 142 (See FIG. 17A) lowers plunger 141, closing purge valve 166 completing the purging position. FIG. 18G shows the filling positon. Lift mechanism 107 lifts refillable fluid container 101 such that pin valve 105 is then inserted into filling head 103. Once pin valve 105 and filling head 103 are engaged, plunger lift mechanism 142 (See FIG. 17A) operates to lower plunger 141 to depress pin valve 105 making the two pieces become fluidly connected and ready for filling. In addition, data port 167 interfaces with liquid level sensor 165 to allow filling station control module 116 to know when refillable fluid container 101 is filled to its designated capacity.

Figure 19:
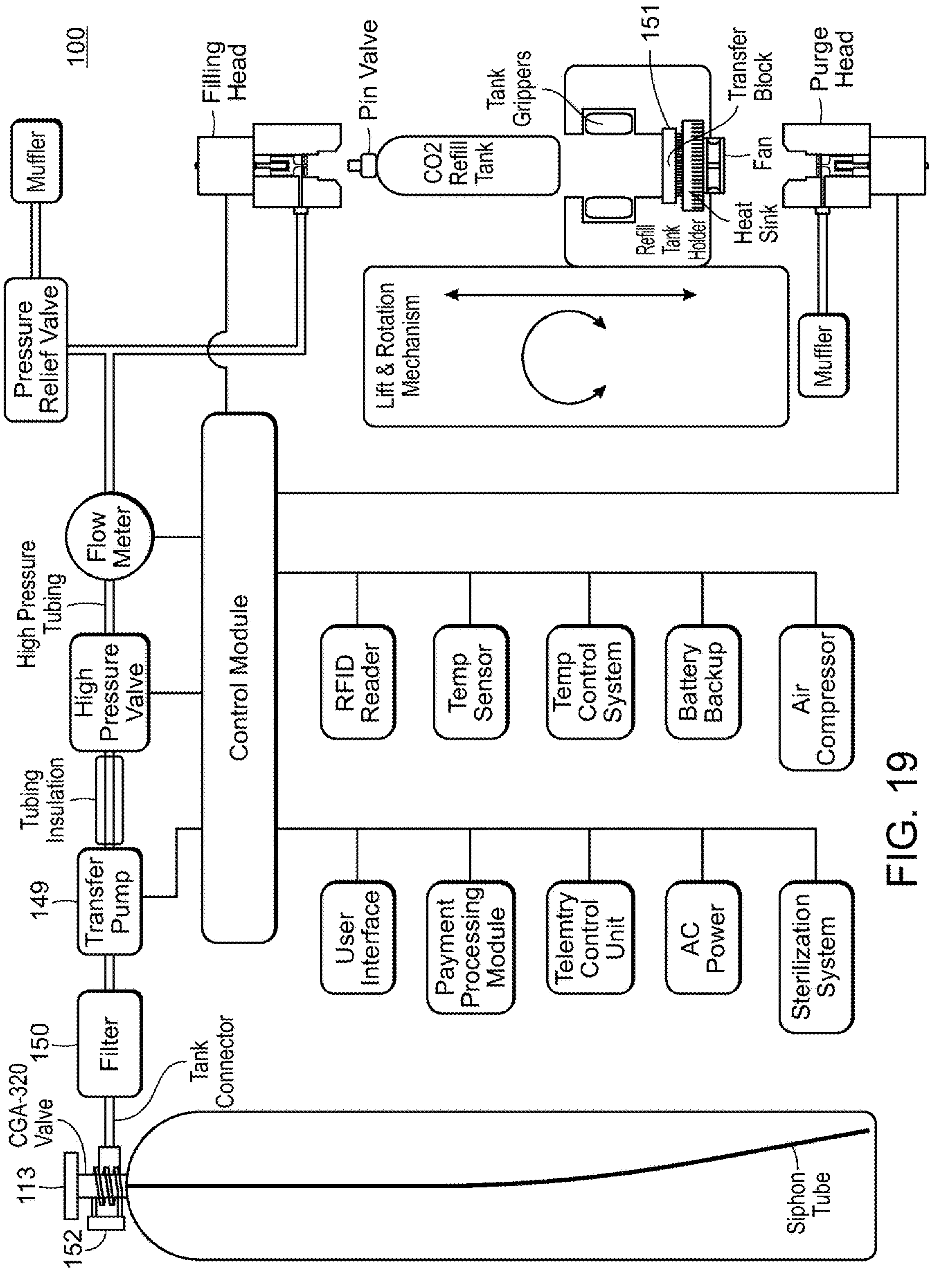
FIG. 19 shows an illustration of yet another embodiment of the present invention.

Referring to FIG. 19, yet another embodiment of the present invention is shown. This embodiment features additional components such as transfer pump 149, filter 150, thermoelectric module 151, and valve heater 152. Transfer pump 149 is beneficial because for many fluids used in connection with the present invention, it is more economical to transfer the fluid in its liquid phase. If both the supply tank and refillable fluid container are at the same temperature, the transfer of the liquid phase of a fluid proves to be difficult due to evaporation when the liquid enters the refillable fluid container creating high pressure. Transfer pump 149 is used to overcome this limitation by forcibly compressing the fluid from the supply tank into the refillable fluid container. Transfer pump 149 may be a pneumatic-based pump, an electrically-powered pump, or any other type of pump used in the high pressure gas industry. This embodiment also features filter 150, which is used to clean the fluid of any debris to inhibit the clogging of any orifice in the present invention. This embodiment also features a sterilization system. This sterilization can be performed by, for example, UV Light, Steam, Chemical, Dry Heat, E-Beam, and the like.

In addition to the above-disclosed features, the embodiment depicted by FIG. 19 also comprises a thermal electric cooler. As mentioned, when the supply tank and the refillable fluid container are the same temperature, fluid transfer in the liquid phase is difficult. To further facilitate this process, thermoelectric module 151 is used so that the environment inside the refillable fluid container allows for the fluid to reach its triple point. The CPU and temperature sensor of the present invention mediate this process in conjunction with thermoelectric module 151. Further, this embodiment of the present invention features valve heater 152. Valve heater 152 can prevent tank valve freeze-up due to high flow conditions that may occur if multiple users refill multiple refillable fluid cylinders in a row. Valve heater 152 can also be used to prevent regulator freeze-up, when a regulator is incorporated in the present invention and to avoid cracking the internal diaphragm of this regulator due to high flow conditions. The heater employed in valve heater 152 can be a standard heating coil powered by electricity and controlled via the integrated CPU and temperature sensor.

Figure 20:
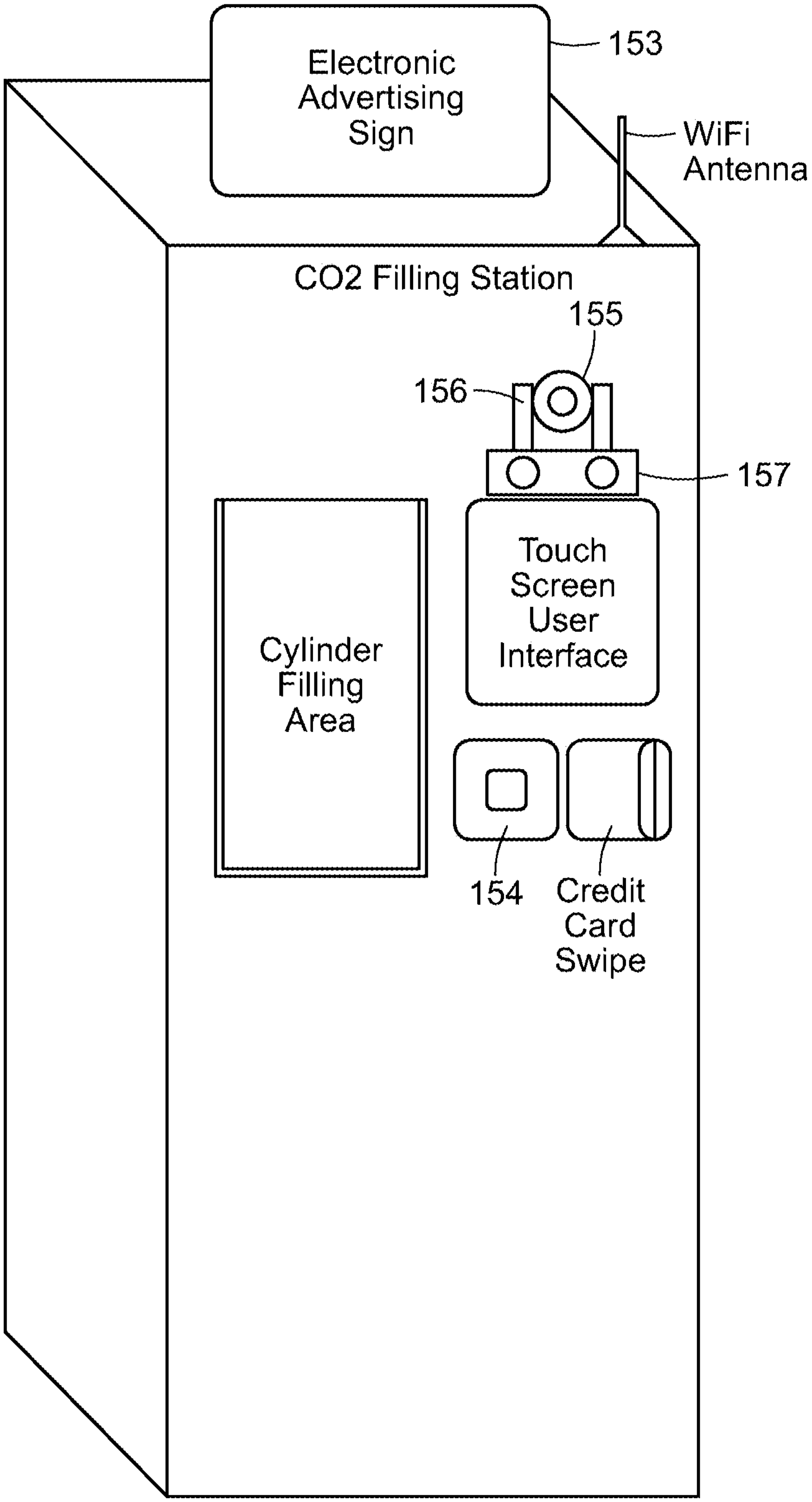
FIG. 20 shows an embodiment of the housing of the present invention.

Referring to FIG. 20, an embodiment of the housing of the present invention is shown. In particular, this embodiment features electronic advertising sign 153, external bar code scanner 154, at least one camera 155, at least one speaker 156, and at least one microphone 157. Electronic advertising sign 153, while located on the top face of said housing, may be located on the top, side or front of the housing. This can be used to attract customers, advertise special deals, provide news, and advertise for other products or services. Electronic advertising sign 153 may comprise an electronic LED sign, LCD display, a digital whiteboard, and the like. In some embodiments electronic advertising sign 153 is replaced with a paper advertisement, a whiteboard, or a chalkboard. In the case of the electronic advertisements they may be remotely programmed and controlled via the internet, preferably over an encrypted internet connection. This embodiment also features an external bar code scanner 154. External bar code scanner 154 may be used by the customers to scan their refillable fluid containers to obtain data about their account, as well as scanning coupons, identifying price, scanning loyalty cards, and the like. At least one camera 155, at least one speaker 156, and at least one microphone 157 are used to provide a real-time 2-way video conferencing setup to use for customer support and video chat. When a customer approaches the present invention, at least one camera 155, at least one speaker 156, and at least one microphone 157 provide for the ability to detect a customer's presence, and can be programmed to display a prerecorded response or connect to a live customer support representative, depending on the circumstance. This interactive real-time response provides for improved customer support. At least one camera 155, at least one speaker 156, and at least one microphone 157 can also be used to collect customer demographic and usage information.

Figure 21:
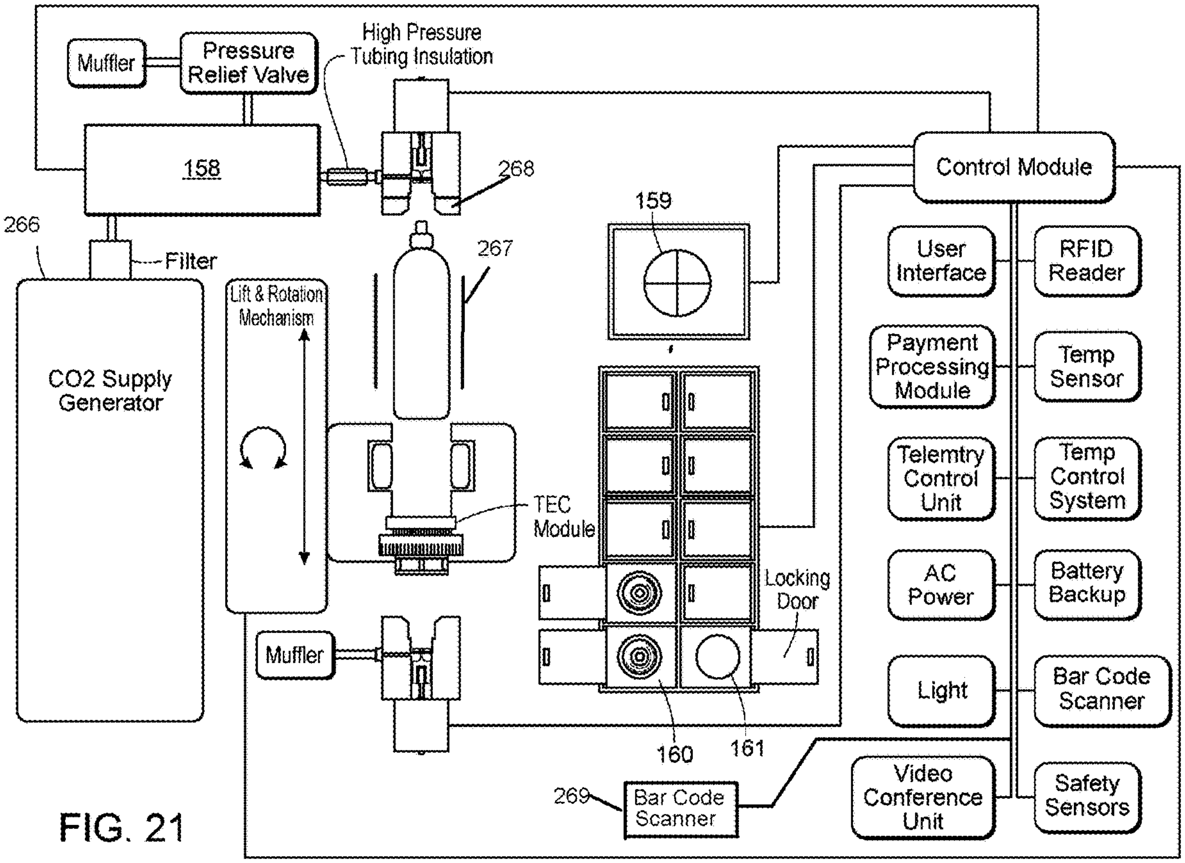
FIG. 21 shows a schematic of one embodiment of the present invention featuring various additional features.

Referring to FIG. 21, a schematic of one embodiment of the present invention featuring various additional features is shown. This figure shows digital mass flow meter 158, empty cylinder repository 159, and at least one cylinder locker 160 having cylinder compartment 161. Specifically, this embodiment of the present invention incorporates a "liquid/gas dosing system" to control and meter the flow of a given fluid flowing from the supply tank into the refill cylinder. This dosing system may incorporate digital mass flow meter with transfer pump 158, attached to an appropriate controller. In a preferred embodiment, instruments in this dosing system contain a uniquely shaped, single loop sensor tube, forming part of an oscillating system. When a fluid flows through the tube, various forces cause a variable phase shift, which is subsequently detected by sensors and then fed into an integrally mounted pc-board. The resulting output signal is proportional to the real mass flow rate, allowing it to be measured. One benefit of this system is that it is fast, accurate and inherently bi-directional. This style of meter works well for fluid in both a gaseous and liquid state. This embodiment also features empty cylinder repository 159, which is a receptacle for users to place their empty $CO_2$ cylinders into during an exchange. It should be noted that these cylinders can be separate from the refillable fluid containers of the present invention, but may still be interfaced and collected with the kiosk of the present invention. Further, this embodiment features, at least one cylinder locker 160 where users can store empty refillable fluid containers, wait for them to be filled, and retrieve them, or users may store empty refillable fluid containers in one locker and may remove a prefilled refillable fluid container from another. This embodiment may optionally feature a plurality of external lights.

Also, FIG. 21 shows a $CO_2$ generation system 266 which can generate source carbon dioxide, a cylinder heater jacket (267), a valve heater (268) and a bar code scanner (269).

Figure 22:
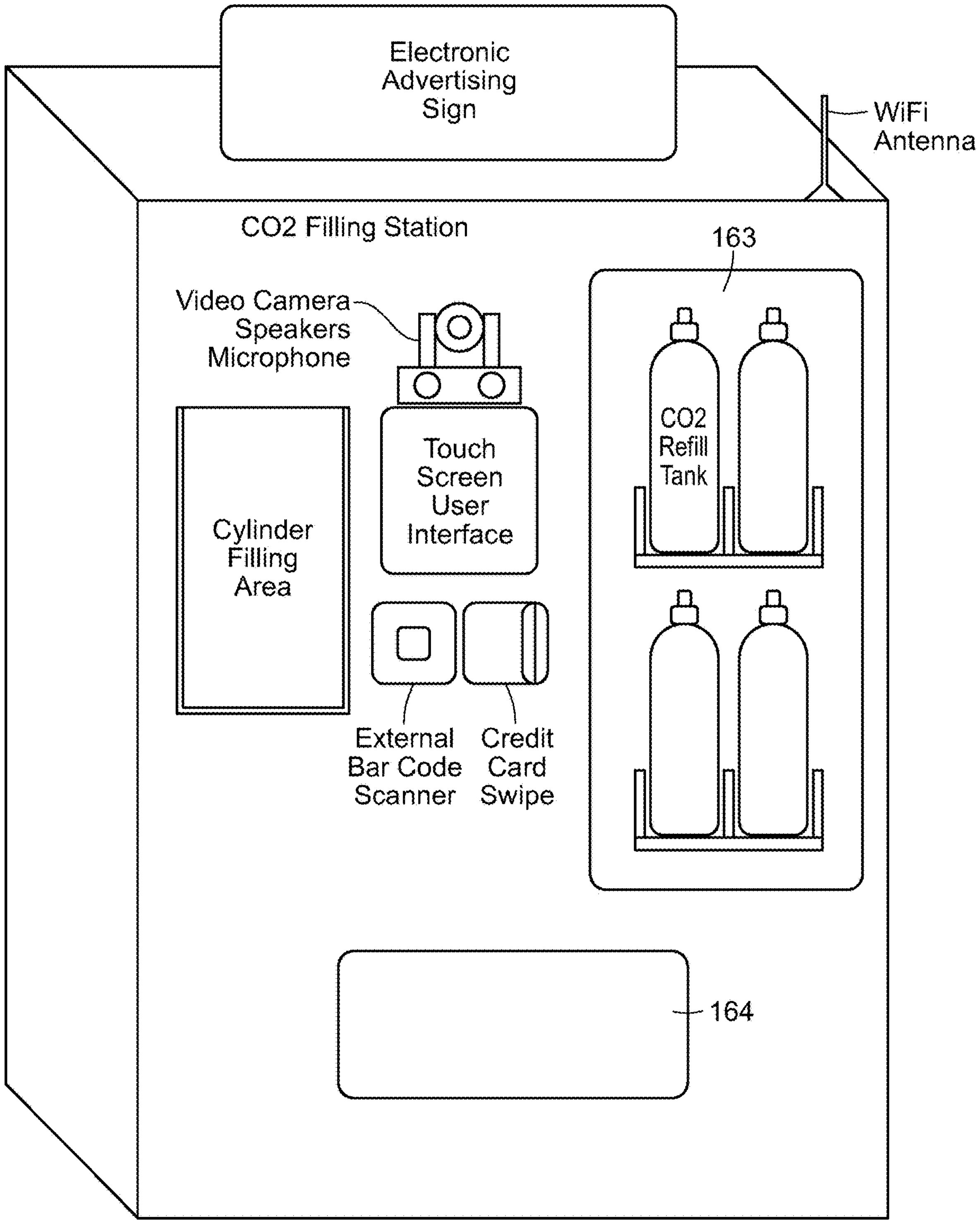
FIG. 22 shows a front view of an embodiment of the present invention incorporating a cylinder dispensing system.

FIG. 22 shows a front view of an embodiment of the present invention incorporating a cylinder dispensing system. Here, the present invention incorporates built-in cylinder dispenser 163 and cylinder pickup 164, allowing customers the ability to purchase new empty cylinders from the present invention and then fill them at time of purchase or at a later date. Cylinder dispenser 163 will operate similar to a bottle vending machine that dispenses soda bottles but is modified to dispense the refillable fluid containers of the present invention. The refillable fluid containers are situated in a vertical storage position in this embodiment. When a new consumer comes to the present invention for the first time they may purchase a new empty cylinder and first-time fluid fill. They swipe their credit card to pay for the new cylinder and the kiosk of the present invention begins dispenses the cylinder to the consumer.

The cylinder is automatically taken from the inside of the machine and mechanically moved by an automated process to a certain dispensing location compartment (similar to a soda vending machine) like cylinder pickup 164. Once the customer has the new cylinder they can fill it in the Filling Station by placing the empty cylinder in the Cylinder Filling Area and follow the filling instructions. When a repeat consumer comes to the present invention they can purchase a fluid refill. They may swipe their credit card to pay for the gas refill, place their empty cylinder into the present invention's cylinder filling area and follow the filling instructions.

Figure 23:
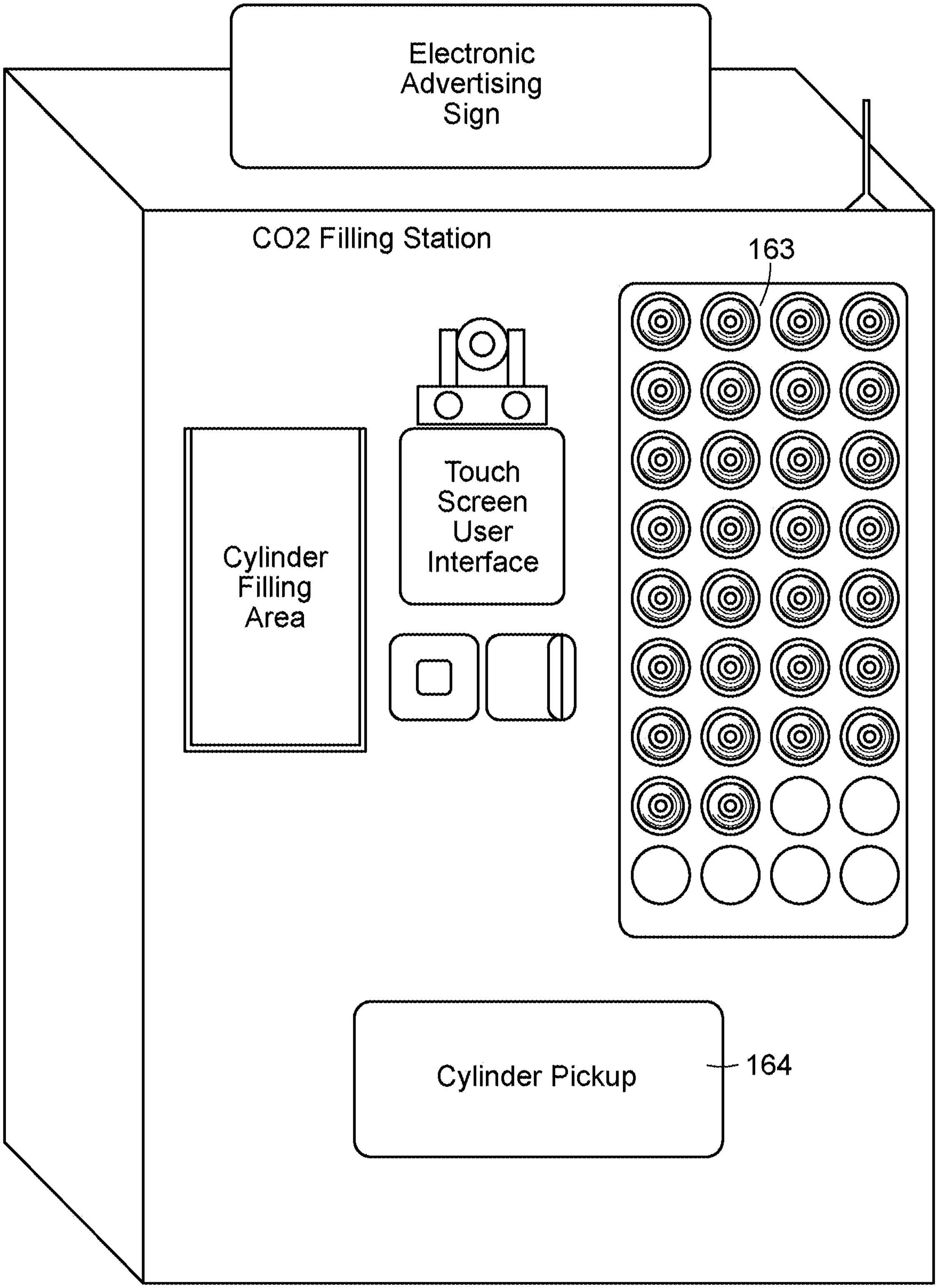
FIG. 23 shows a front view of an embodiment of the present invention incorporating an alternative cylinder dispensing system.

FIG. 23 shows a front view of an embodiment of the present invention incorporating an alternative cylinder dispensing system. This embodiment is very similar to the embodiment shown in FIG. 22, however in this embodiment, the cylinders are placed into cylinder dispenser 163 in a horizontal orientation, as opposed to a vertical orientation.

Figure 24:
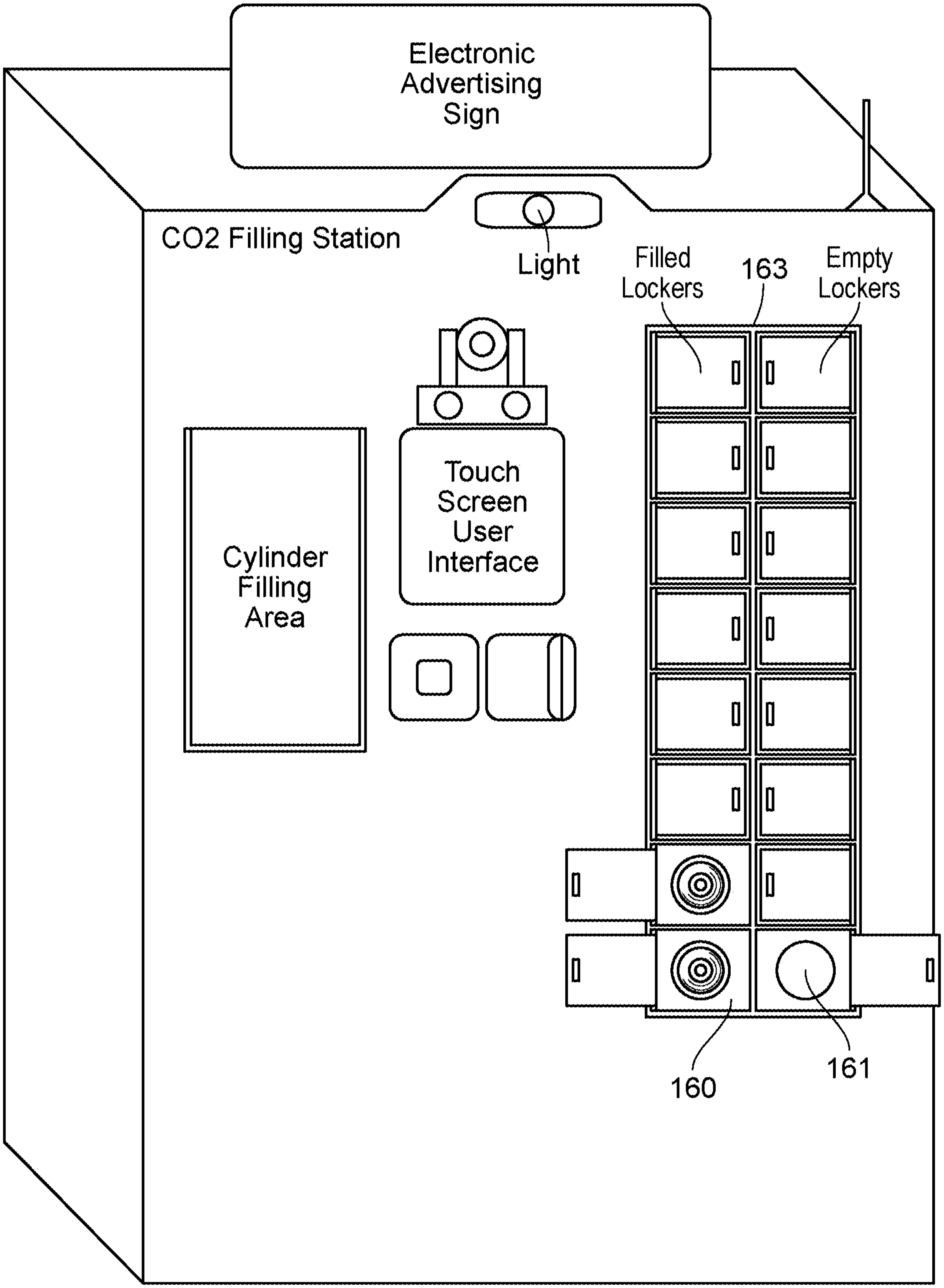
FIG. 24 shows a front view of an embodiment of the present invention incorporating another alternative cylinder dispensing system.

Referring to FIG. 24, a front view of an embodiment of the present invention incorporating another alternative cylinder dispensing system is shown. Here, the present invention features at least one cylinder locker 160, and cylinder compartment 161. This embodiment also incorporates a built-in cylinder dispenser 163 and an exchange system. This embodiment accepts empty cylinder returns and dispenses filled cylinders via an exchange based system using a Cylinder Locker Dispensing/Exchange System. It also allows repeat customers to refill their own cylinders. The Filling Station can have varying cylinder storage capacities and is not limited to the capacities in the drawings. The Filling Station starts out with a mix of exchangeable filled cylinders and new empty cylinders. Here, the present invention accepts empty cylinder returns and dispenses filled cylinders via an exchange based system using at least one cylinder locker 160. When a new customer comes to the Filling Station for the first time they can purchase a new empty cylinder and initial fluid fill. They swipe their credit card to pay for the new cylinder and the Filling Station dispenses the cylinder to the consumer via the Cylinder Locker Dispensing/Exchange System. When the consumer pays, a cylinder locker 160 door opens and allows the consumer to take their new cylinder. Once the customer has the new cylinder they can fill it in the Filing Station by placing the empty cylinder in the cylinder filling area and follow the filling instructions.

Repeat customers have two options available to them. The first option is they can purchase a fluid refill using their existing cylinder. They swipe their credit card to pay for the gas refill, place their empty cylinder into the cylinder filling area and follow the filling instructions. The second option is they can purchase a refillable fluid container exchange. They swipe their credit card to pay for the cylinder exchange, scan their empty cylinder with the external bar code reader, place their empty cylinder into one of the empty cylinder locker compartments, the RFID tag on the cylinder communicates with the RFID reader in the filling station and confirms it is in the locker compartment and then the customer closes the locker door. The Filling Station then opens one of the filled cylinder locker 160 doors to release a filled cylinder to the customer. The exchange is now complete.

Figure 25:
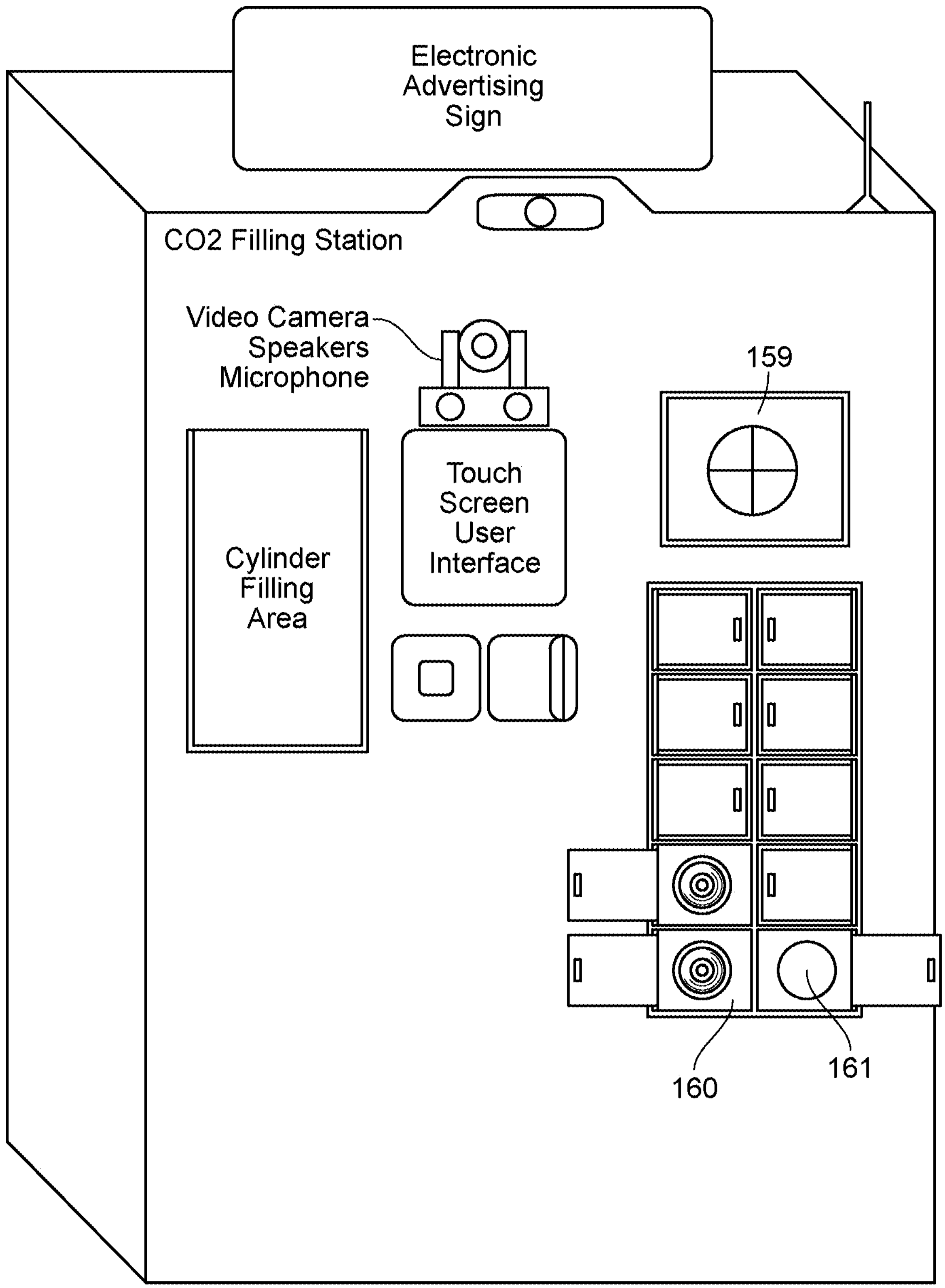
FIG. 25 shows a front view of an embodiment of the present invention incorporating an empty cylinder repository and exchange locker system.

FIG. 25 shows a front view of an embodiment of the present invention incorporating an empty cylinder repository 159. Here, an embodiment similar to the one shown in FIG. 24 is shown, however, in this embodiment, users place their empty cylinders into empty cylinder repository 159, and merely retrieve a pre-filled cylinder or new empty cylinder from at least one cylinder locker 160.

Figure 26:
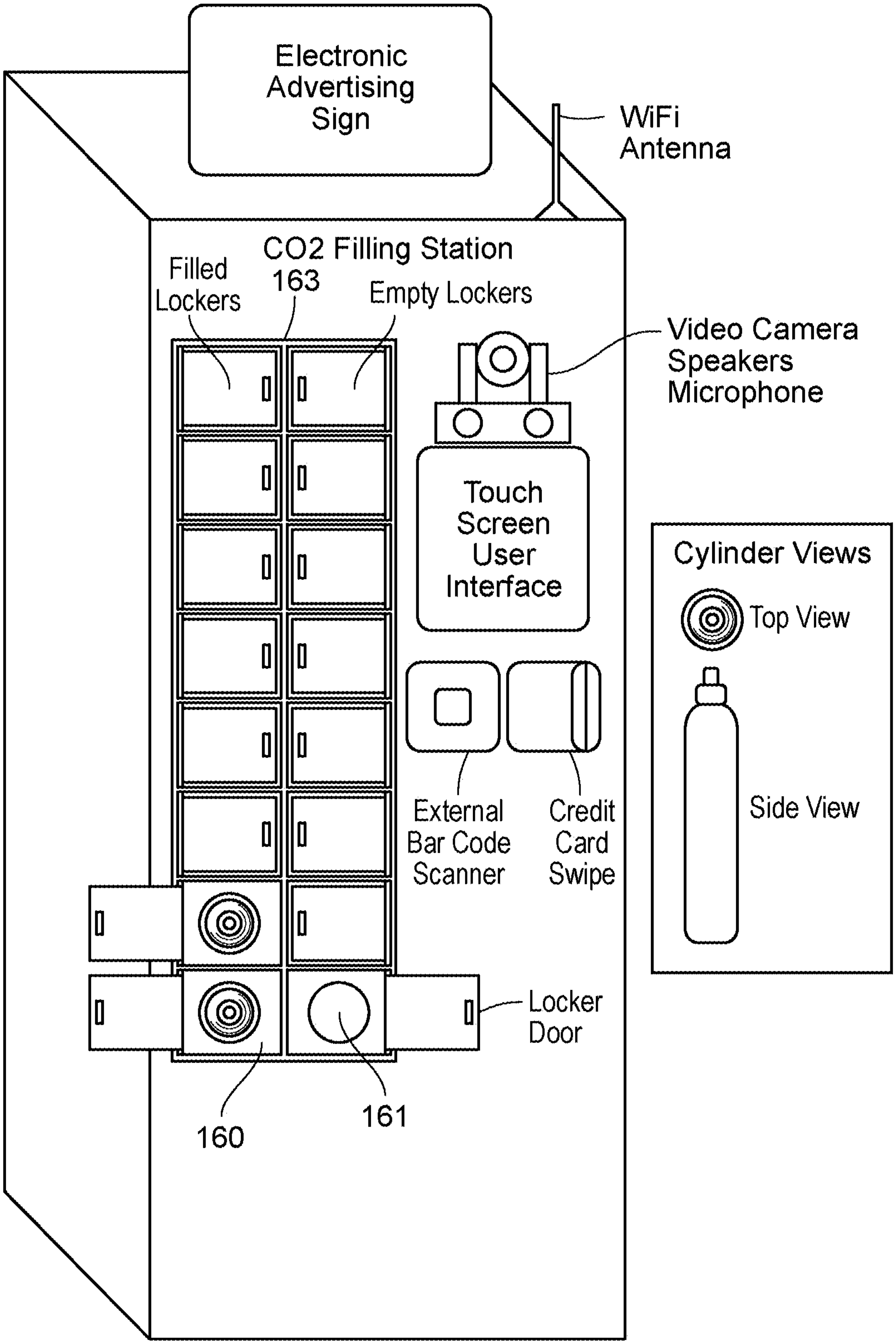
FIG. 26 shows an embodiment of the present invention incorporating a cylinder exchange locker system.

Referring to FIG. 26, an embodiment of the cylinder exchange and bottle dispenser of the present invention is shown. In this embodiment, the present invention is not capable of refilling a refillable fluid container. Rather, this embodiment accepts empty cylinder returns and dispenses filled cylinders via an exchange based system utilizing at least one cylinder locker 160. The Filling Station can have varying cylinder storage capacities and is not limited to the capacities in the drawings. The Filling Station starts out with a mix of exchangeable filled cylinders and new empty cylinders. The cylinders for this Filling Station are refilled at a separate filling location and placed in the vending machine when needed. When a new customer comes to the Filling Station for the first time they can purchase a new filled cylinder. They swipe their credit card to pay for the new filled cylinder and the Filling Station dispenses the cylinder to the consumer via the Cylinder Locker Dispensing/Exchange System. When the consumer pays, a locker compartment door opens and allows the consumer to take their new filled cylinder. When a repeat customer comes to the Filling Station they can purchase a refillable fluid container exchange. They swipe their credit card to pay for the cylinder exchange, scan their empty cylinder with the external bar code reader, place their empty cylinder into one of the empty cylinder locker compartments, the RFID tag on the cylinder communicates with the RFID reader in the filling station and confirms it is in the locker compartment and then the customer closes the locker door. The Filling Station then opens one of the filled cylinder locker compartments to release a filled cylinder to the customer. The exchange is now complete. It is important to note that a "refillable fluid container exchange" is considered exchanging an empty refillable fluid container for a filled refillable fluid container.

Figure 27:
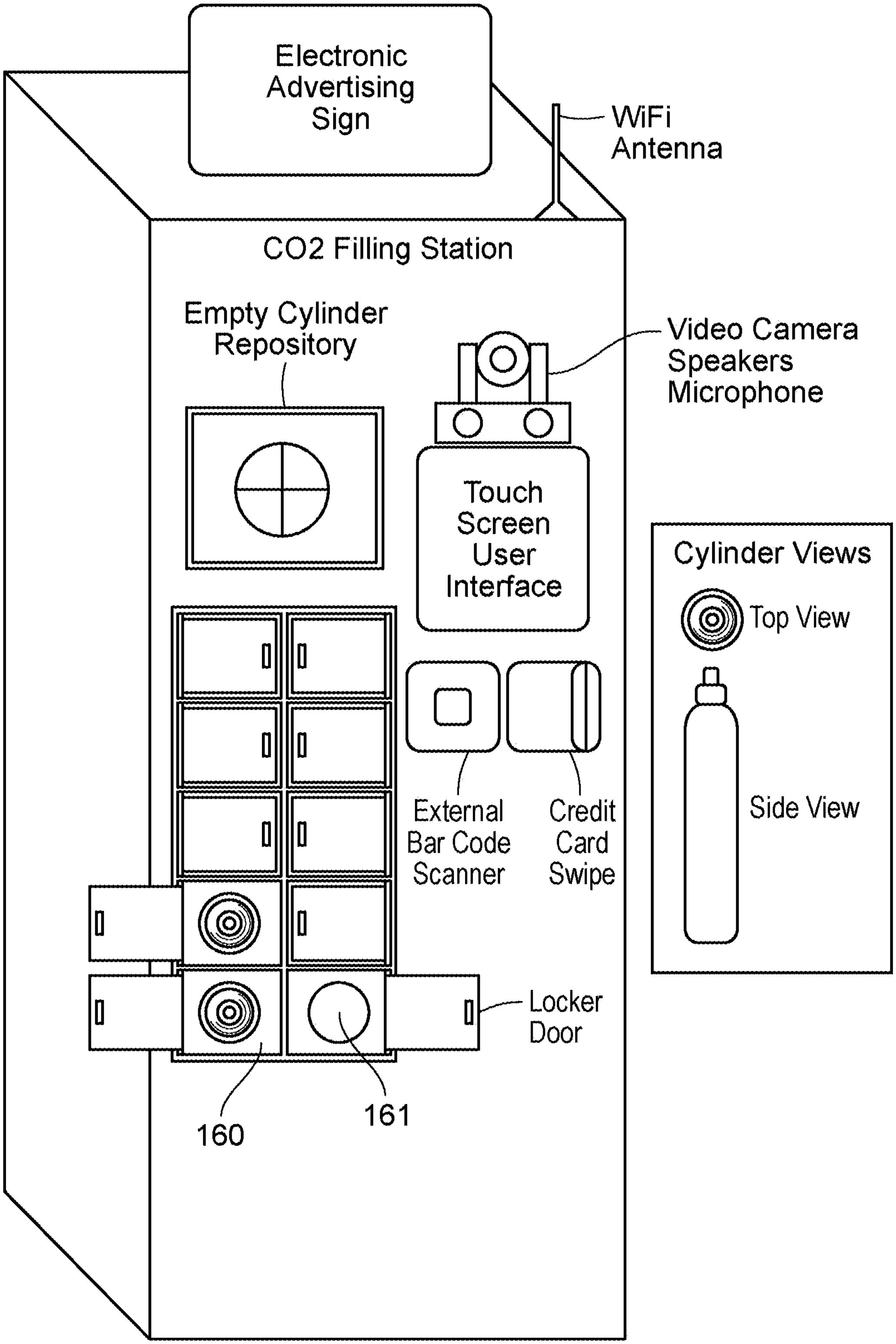
FIG. 27 show an alternative embodiment of the present invention incorporating a cylinder dispensing locker system with empty cylinder repository.

FIG. 27 shows an alternate embodiment of the cylinder exchange and bottle dispenser of the present invention. This embodiment accepts empty cylinder returns via the empty cylinder repository 159 and dispenses filled cylinders via an exchange based system at least one cylinder locker 160. The Filling Station can have varying cylinder storage capacities and is not limited to the capacities in the drawings. The Filling Station starts out with exchangeable filled cylinders in all of the cylinder lockers 160. The cylinders for this Filling Station are refilled at a separate filling location and placed in the vending machine when needed. When a new customer comes to the Filling Station for the first time they can purchase a filled cylinder as a new customer for a slight upcharge. They swipe their credit card to pay for the filled cylinder and the Filling Station dispenses the cylinder to the consumer via the Cylinder Locker Dispensing/Exchange System. When the consumer pays, a locker compartment door opens and allows the consumer to take their filled cylinder. When a repeat customer comes to the Filling Station they can purchase a refillable fluid container exchange whereby they are actually only paying for the gas inside the cylinder at a discounted cost. They swipe their credit card to pay for the cylinder exchange, scan their empty cylinder with the external bar code reader, place their empty cylinder into the empty cylinder repository 159, the RFID tag on the cylinder communicates with the RFID reader in the filling station and confirms return of the empty cylinder. The Filling Station then opens one of the filled cylinder locker compartments to release a filled cylinder to the customer. The exchange is now complete.

In one preferred embodiment, the high pressure valve and/or said pressure relief valves of the present invention are solenoids. In other embodiments, the pressure sensor of the present invention is selected from the group consisting essentially of: pressure sensors, pressure transducers, vacuum transmitters, vacuum transducers, low pressure transducers, electronic pressure sensors, and electronic pressure transducers. Further, in alternative embodiments, the flow meter of the present invention is selected from the group consisting essentially of: Coriolis Mass meters, vane/piston meters, float-style meters, positive displacement meters, thermal meters, laminar flow elements, paddle wheel meters, magnetic meters, ultrasonic meters, turbine meters, differential pressure meters, and vortex shredding meters.

In various embodiments, the present invention may be optimized to operate with a specific fluid. For example, the present invention may further comprise a high pressure air compressor such that ambient air may be dispensed into the refillable fluid container of the present invention. As another non-limiting example, the refillable fluid container of the present invention may be equipped with an exhaust port such that the present invention may be used to refill fire extinguishers.

Electronic identifier 146 functions as an electronic identifier for the present invention to identify all information about the cylinder and prevent/allow refilling of refillable fluid container 101. In one embodiment, electronic identifier 146 also functions as a safety measure to prevent filling of unauthorized third-party refillable fluid containers 101. If a user places a non-authorized refillable fluid container into the fluid filling station 100, the station will not operate. In one embodiment, the present invention will only operate upon sensing an electronic identifier that has the appropriate proprietary algorithm stored on it.

Likewise should refillable fluid container 101 be placed in a device such as the one taught by U.S. Pat. No. 8,985,395, electronic identifier 145 will identify refillable fluid container 101 to allow operation of the beverage machine with refillable fluid container 101. The device described by U.S. patent application Ser. No. 14/641,013 is also suitable for this purpose.

In a preferred embodiment these refillable fluid containers comprise 16 oz food grade aluminum Type DOT3AL-1800 cylinders equipped with a proprietary connection fitting. In another embodiment the filling mechanism and refillable fluid container can be enclosed in a high pressure containment enclosure to create an environment of 5 atmospheres or higher. By creating a 5 atmosphere environment or higher the fluid will stay in a liquid state while performing the fluid transfer from the supply tank to the refill tank. When using this method, a cylinder cooling system will not be needed.

In another preferred embodiment, the radio communications controller of the present invention transmits user specific data to an external server to be associated with a user's account. This data is captured through the present invention's QR Code/Bar Code/RFID Reader/Video Camera/Microphone/User Interface and can be used to build a usage profile for every customer. This data is used to benefit the customer as well as the Company to make the users' experience simple and track user statistics. The transmittal of data between the filling station and Company's backend servers can be assumed to be protected under secure Wi-Fi standards, firewalls and standard internet security procedures that would already be in place.

Examples of data collection include, but are not limited to a user's name, address, phone, email, password, frequency of usage, special coupons, reminders emails, demographic identifiers and $CO_2$ usage.

Further, the present disclosure contemplates a software application companion to the present invention. This software application will work with, for example Windows Phone, iPhone, Android type phones, and iPads, among many other devices. The software application "talks" to the present invention and an external server via the internet using a data exchange to provide inventory updates and sync details between the filling station and users' online account. For example when the user purchases a new refillable fluid container they can simply use this software application to scan the QR Code/Bar Code on the refillable fluid container and add that item to their online user account for tracking.

Further, the software application provides a dashboard to the user to show them their filling stats which can include but not limited to number of drinks per day/week/month and this can in turn be integrated into the users' diet program or data can be shared with various popular other software applications like My Fitness PAL®, iFit®, etc. to be part of a total dietary health program. In addition, the software application will interface with a device such as the one taught by U.S. Pat. No. 8,985,395 as well as the device described by U.S. patent application Ser. No. 14/641,013.

In another preferred embodiment, the present invention can also incorporate a liquid/gas dosing system to control and meter the flow of liquid fluid from the supply tank into the refill cylinder. This can be in the form of a Digital Mass Flow Meter with Controller. Further, the present invention may incorporate external lights to illuminate the outside of the vending machine to make it easier to see at night. It should be noted that fluid used in the present invention, particularly when the fluid is $CO_2$ may come from any suitable means such as a cylinder, bulk tank, $CO_2$ generation based system, zeolite system, etc. In another preferred embodiment, the present invention can also incorporate a cylinder dispensing sidecar. This is an attachment that connects to the main Filling Station that adds additional functionality to be able to allow customers to purchase $CO_2$ cylinders or any other relevant product from the main unit. Further, fluids are intended to not be limited to a particular phase state, and can refer to the gas phase, liquid phase, or some combination thereof.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the disclosure refers to exemplary embodiments, it will be understood by those skilled in the art that various changes may be made and equivalents may be substituted for elements thereof without departing from the scope of the disclosure. In addition, many modifications will be appreciated by those skilled in the art to adapt a particular instrument, situation or material to the teachings of the disclosure without departing from the spirit thereof. Therefore, it is intended that the disclosure not be limited to the particular embodiments disclosed.

What is claimed is:

1. A fluid filling station, comprising:

a supply tank configured to supply a fluid to a filling head via at least one length of tubing;

a holder shaped to receive a refillable fluid container; and a lift mechanism capable of bringing the refillable fluid container into fluid communication with the filling head in a manner where the refillable fluid container is capable of receiving fluid from the supply tank.

2. The fluid filling station of claim 1, wherein the refillable fluid container comprises a cylinder constructed of aluminum.

3. The fluid filling station of claim 1, wherein the fluid comprises liquid carbon dioxide.

4. The fluid filling station of claim 1, wherein the holder comprises a gripper capable of securing the refillable fluid container in the holder.

5. The fluid filling station of claim 1, wherein the purge head comprises a plunger capable of depressing the purge valve to purge fluid within the refillable fluid container.

6. The fluid filling station of claim 5, further comprising a plunger lift mechanism capable of raising the plunger to depress the purge valve.

7. The fluid filling station of claim 5, further comprising a plunger lift mechanism capable of raising the plunger to a purging position where the purge valve is depressed and subsequently lowering the plunger to complete the purging position.

8. The fluid filling station of claim 7, wherein the lift mechanism, subsequent to the plunger lift mechanism lowering the plunger to complete the purging position, is capable of bringing a valve disposed on a top of the refillable fluid container into fluid communication with the filling head.

9. The fluid filling station of claim 8, further comprising a control module capable of being in communication with a fluid level sensor of the refillable fluid container to control filling of the refillable fluid container.

10. The fluid filling station of claim 1, wherein the purge valve interfaces with the refillable fluid container via a threaded connection.

11. The fluid filling station of claim 1, further comprising a muffler in fluid communication with the purge head.

12. The fluid filling station of claim 1, wherein the refillable fluid container comprises:

a valve disposed on a top of the refillable fluid container capable of engaging with the filling head; and a purge valve disposed on a bottom of the refillable fluid container capable of engaging with a purge head of the holder.

13. The fluid filling station of claim 1, wherein the filling head comprises a sleeve actuated connector.

14. The fluid filling station of claim 1, further comprising a solenoid valve in fluid communication with the supply tank and the filling head.

* * * * *